(12) United States Patent
Löppönen et al.

(10) Patent No.: US 7,386,000 B2
(45) Date of Patent: *Jun. 10, 2008

(54) PACKET MODE SPEECH COMMUNICATION

(75) Inventors: Jussi Löppönen, Helsinki (FI); Jarno Rajahalme, Kirkkonummi (FI); Hannu Töyrylä, Helsinki (FI); Markku Vimpari, Oulu (FI); Richard Bontempi, Helsinki (FI)

(73) Assignee: Nokia Corporation (FI)

( * ) Notice: Subject to any disclaimer, the term of this patent is extended or adjusted under 35 U.S.C. 154(b) by 1421 days.

This patent is subject to a terminal disclaimer.

(21) Appl. No.: 09/835,867

(22) Filed: Apr. 17, 2001

(65) Prior Publication Data

US 2002/0150091 A1    Oct. 17, 2002

(51) Int. Cl.
*H04J 3/17* (2006.01)

(52) U.S. Cl. .................. 370/433; 370/432; 370/310; 370/411

(58) Field of Classification Search ........ 370/229–230, 370/310, 389, 310.1, 316, 327, 328–329, 370/340–341, 395.1, 431–433, 464–465, 370/468, 480, 492–493, 498, 501; 455/411, 455/426, 428, 430

See application file for complete search history.

(56) References Cited

U.S. PATENT DOCUMENTS

| | | | |
|---|---|---|---|
| 5,650,995 A * | 7/1997 | Kent | 455/508 |
| 5,717,830 A * | 2/1998 | Sigler et al. | 455/426.1 |
| 5,901,363 A | 5/1999 | Toyryla | |
| 6,023,626 A | 2/2000 | Kinnunen et al. | |
| 6,141,347 A | 10/2000 | Shaughnessy et al. | 370/390 |
| 6,240,069 B1 | 5/2001 | Alperovich et al. | |
| 6,757,365 B1 * | 6/2004 | Bogard | 379/88.17 |
| 6,930,994 B1 * | 8/2005 | Stubbs | 370/348 |
| 6,970,926 B1 * | 11/2005 | Needham et al. | 709/225 |
| 7,020,130 B2 * | 3/2006 | Krause et al. | 370/352 |
| 7,203,490 B2 * | 4/2007 | Karabinis et al. | 455/428 |
| 2002/0037735 A1 | 3/2002 | Maggenti et al. | |

(Continued)

FOREIGN PATENT DOCUMENTS

EP    1 182 895    2/2002

(Continued)

OTHER PUBLICATIONS

Plasse, "Call Control Scenarios in the "all-IP" UMTS Core Network," Personal, Indoor and Mobile Radio Communications PIMRC 2002, Sep. 18-21, 2000, vol. 1, pp. 322-326.

(Continued)

*Primary Examiner*—Wing Chan
*Assistant Examiner*—Mark A. Mais
(74) *Attorney, Agent, or Firm*—Pillsbury Winthrop Shaw Pittman, LLP

(57) ABSTRACT

A packet mode (e.g. IP) group communication service layer is provided on top of a standard mainstream cellular radio network. Conceptually, the group communication layer includes a pair of basic logical entities, an application bridge and a call processing server (CPS). The bridge and the CPS run group service applications which communicate with group service application(s) in a mobile station MS over the IP connections provided by the radio network. The CPS is responsible for control plane management of group communications. The bridge is responsible for the real-time distribution of VoIP packets to the user terminals according to their group memberships over valid connections programmed by the CPS.

51 Claims, 6 Drawing Sheets

U.S. PATENT DOCUMENTS

2002/0061760 A1    5/2002   Maggenti et al.

FOREIGN PATENT DOCUMENTS

| WO | WO 97/28658 | 8/1997 |
| WO | WO 09/25423 | 6/1998 |
| WO | WO 99/63773 | 12/1999 |
| WO | WO 00/40045 | 7/2000 |
| WO | WO 00/57656 | 9/2000 |
| WO | WO 01/67674 | 9/2001 |
| WO | WO 01/67787 | 9/2001 |
| WO | WO 02/32165 | 4/2002 |

OTHER PUBLICATIONS

ETSI TS 101.315 V1.1.1 (Mar. 2002), Telecommunications and Internet Protocol Harmonization Over Networks (TIPHON) Release 3; Functional entities, information flow and reference point dfinitions; Guidelines for application of TIPHON functional architecture to inter-domain services, 43 pp.

* cited by examiner

PACKET MODE SPEECH COMMUNICATION

FIELD OF THE INVENTION

The invention relates to communications systems, and especially to packet mode speech communication in communications systems.

BACKGROUND OF THE INVENTION

A mobile communications system refers generally to any telecommunications system which enables wireless communication when users are moving within the service area of the system. A typical mobile communications system is a Public Land Mobile Network (PLMN). Often the mobile communications network is an access network providing a user with wireless access to external networks, hosts, or services offered by specific service providers.

Professional mobile radio or private mobile radio (PMR) systems are dedicated radio systems developed primarily for professional and governmental users, such as the police, military forces, oil plants, etc. PMR services have been offered via dedicated PMR networks built with dedicated PMR technologies. This market is divided between several technologies—analog, digital, conventional and trunked—none of which has a dominating role. TETRA (Terrestrial Trunked Radio) is a standard defined by ETSI (European Telecommunications Standards Institute) for digital PMR systems. U.S. Pat. No. 6,141,347 discloses a wireless communications system which uses multicast addressing and decentralized processing in group calls.

One special feature offered by the PMR systems is group communication. The term "group", as used herein, refers to any logical group of three or more users intended to participate in the same group communication, e.g. call. The groups are created logically, i.e. special group communication information maintained on the network side associates specific user with a particular group communication group. This association can be readily created, modified or canceled. The same user may be a member in more than one group communication group. Typically, the members of the group communication group belong to the same organization, such as the police, the fire brigade, a private company, etc. Also, typically, the same organization has several separate groups, i.e. a set of groups.

A group call typically has a long duration (up to days) during which communication takes place quite infrequently and each interaction is typically short. The total active traffic may be, for example, only 15 minutes during a call. Each talk burst or speech item has an average length of 7 seconds in the existing PMR systems. Therefore, the radio channels or other expensive system resources cannot be allocated all the time, because the service becomes much too expensive. Group communication with a push-to-talk feature is one of the essential features of any PMR network overcoming this problem. Generally, in group voice communication with a "push-to-talk, release-to-listen" feature, a group call is based on the use of a pressel (PTT, push-to-talk switch) in a telephone as a switch: by pressing a PTT the user indicates his desire to speak, and the user equipment sends a service request to the network. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user can talk and the other users listen on the channel. When the user releases the PTT, the user equipment signals a release message to the network, and the resources are released. Thus, the resources are reserved only for the actual speech transaction or speech item.

There are typically various requirements for group communications in communications systems.

Call set up times must be relatively short, i.e. set up times in the order of several seconds cannot be allowed. When a user initiates a call, or rather, a talk item, he/she should be able to start-speaking at the initiation of the set up within few hundreds of milliseconds. The listening parties should hear the talk possibly within approximately a second. This voice delay can be longer because a semi-duplex mechanism is used. These values are only examples.

Group communication requires traffic discipline: one talks and the others listen. Therefore the radio interface is of a semi-duplex type. Only one direction is active at a time. The communications system must be able to control that only one member speaks at a time in a group.

A user can belong to many groups at a same time. Therefore, a communications system must be able to select and prioritize the group the user listens to if there are multiple group communications to the user at the same time.

Not only to traditional PMR users, push-to-talk type of group calls are also attractive to several other types of users, too. For example, private persons might want to have talk groups, such as hobby groups, sport groups, etc. Small business users might also use the push-to-talk type of group communication feature for a more frequent job related communication during a working day within the same work group, either inside the company or within some business community.

SUMMARY OF THE INVENTION

An object of the invention is to provide a new way to provide and manage a packet mode speech communication service.

According to one aspect of the invention, a mainstream cellular radio network functions as a radio access network on top of which a packet mode (e.g. IP based) group communication service is provided. Practically all new elements and functionalities required by the invention are outside the radio access and mobile core networks. The radio access and mobile core network can be used as such without any need for costly changes in the mainstream network elements. In other words, the group communication service can be run through standard main stream radio access networks (such as GSM and UMTS) such that the investment per end user in the infrastructure is low enough and thereby attractive to the operators. In an embodiment of the invention the group communication service is implemented as a Voice over IP (VoIP) data application on top of the IP data service of the mobile radio network. Any user which is active in an IP-based group communication service, e.g. active in a group call, has a pre-established logical connection through the radio access network to the group communication service entities. For example, logical connections similar to the packet data protocol (PDP) contexts used in the GPRS service (General Packet Data Service) may be used. The actual communication path, including the channel resources at the air interface in the sending and receiving ends, needs to be opened and the resources to be reserved only for the duration of the talk item. Call set-up signaling, authentication, agreement of encryption keys and negotiation of service parameters are not needed in the resource reservation phase, because the logical connections already exist, but the physical resources are reserved and opened by using the signaling procedures. Thus, short connection set up times can be achieved.

Another aspect of the invention is a method for packet mode group voice communication in a communications system, comprising the steps of providing a group server, providing said group server with individual addresses of group members in at least one group communication group, sending voice packets from one of said group members to said group server, each voice packet being addressed to said at least one group, forwarding said voice packets individually to each receiving one of said group members on the basis of said individual addresses.

Still another aspect of the invention is a method for packet mode group voice communication in a communications system, comprising the steps of providing a group server on top of said communications system, providing said group server with individual addresses of group members of a group communication group, creating an individual logical connection from each group member to said group server by means of outband signaling, starting a speech item in said group by sending a leader packet from one of said group members to said group server over said individual logical connection, each leader packet containing the identifier of the respective group member.

said group server either i) rejecting said started speech item, or ii) granting the started speech item to said one group member and forwarding said leader packet and subsequent voice packets individually to each receiving one of said other members in said group on the basis of said individual addresses.

Another aspect of the invention is a method of managing speech items in a communications system having a packet mode group voice communication feature, comprising the steps of providing a group server for serving a group communication group, granting a speech item to one group member of said group communication group, setting a first timer to measure a predetermined idle period in response to said granting, resetting said first timer each time a voice packet is received from said one of said group members to said group server, ending said granted speech item if said first timer expires indicating that said predetermined idle period has elapsed from said granting or from last reception of a voice packet from said one group member.

Still another aspect of the invention is a method of managing traffic streams in a communications system having a packet mode group voice communication feature, comprising the steps of providing a server for managing traffic streams addressed to a user who is active in at least one group communication group or in a one-to-one communication, receiving at said user specific server a first voice packet stream related to a first group or one-to-one communication and forwarding said first voice packet stream to said respective user, monitoring at said user specific server continuity of said first voice packet stream, receiving at said user specific server at least one further voice packet stream related to at least one further group or one-to-one communication, forwarding no one of said at least one further voice packet streams to said user if said first voice packet data stream is continuous, forwarding one of said at least one further voice packet streams to said user if said first voice traffic stream has been discontinued for a predetermined period of time.

Another aspect of the invention is a server system for providing a packet mode group communication service for a communications system, said server system comprising a group server provided on top of said communications system, said group server further comprising a data memory storing individual addresses of group members in at least one group communication group, a mechanism receiving voice packets from said group members, each received voice packet containing information identifying the communication group which the respective packet is addressed to, a mechanism for granting a speech item to one group member per communication group in turn, a mechanism unicasting each voice packet received from said group member having a speech item in a group communication group separately to each receiving member in said respective group communication group on the basis of said individual addresses.

Another aspect of the invention is a server system for providing a packet mode group communication service for a communications system, said server system comprising a group server provided on top of said communications system, said group server further comprising a mechanism which identifies and authenticates a source of group communication, a mechanism which controls that only one group member in a group talks at a time, a mechanism which checks active group members in a group to which voice packets from a currently talking group member are destined to and generates from an incoming voice packet an outgoing packet to be forwarded separately to each of said active group members, and a mechanism which selects from possible multiple incoming traffic streams destined to one group member the one which is to be forwarded to said one group member.

Still another aspect of the invention is a server system for providing a packet mode group communication service for a communications system, said server system comprising at least one first server providing group specific communications functions, said first server further comprising a data memory storing individual addresses of group members in at least one group communication group, a mechanism receiving voice packets from said group members, each received voice packet containing information identifying the communication group which the respective packet is addressed to, a mechanism for granting a speech item to one group member per communication group in turn, a mechanism unicasting each voice packet received from said group member having a speech item in a group communication group separately to each receiving member in said respective group communication on the basis of said individual addresses, a second server providing user-specific communications functions, any group related communication from a user managed by said second server being routed first to said second server and then forwarded to an appropriate first server, and any unicast voice packet from said at least one first server being routed first to said second server prior to sending the voice packet to the respective user.

Another aspect of the invention is a server system for providing a packet mode group communication service for a communications system, said server system comprising at least one group server providing group specific communications functions, said group server further comprising a mechanism which controls that only one group member in a group talks at a time, a mechanism which checks active group members in a group to which voice packets from a currently talking group member is destined to and generates from an incoming voice packet an outgoing packet to be forwarded separately to each of said active group members, a user server providing user-specific communications functions on a user plane, said user server further comprising a mechanism which identifies and authenticates a source of group communication, a mechanism which selects from possible multiple incoming traffic streams destined to one group member the one which is to be forwarded to said one group member.

Another aspect of the invention is a server system for providing a packet mode group communication service for a communications system, said server system comprising at least one group server providing group specific communications functions on a user plane, said group server further comprising a data memory storing individual addresses of group members in at least one group communication group, a mechanism receiving voice packets from said group members, each received voice packet containing information identifying the communication group which the respective packet is addressed to, a mechanism for granting a speech item to one group member per communication group in turn, a mechanism unicasting each voice packet received from said group member having a speech item in a group communication group separately to each receiving member in said respective group communication on the basis of said individual addresses, a user server providing user-specific communications functions on a user plane, any group related communication from a user managed by said user server being routed first to said user server and then forwarded to an appropriate group server, and any unicast voice packet from said at least one group server being routed first to said user server prior to sending the voice packet to the respective user, a group call processing server responsible for control plane management of the group communications in said group server, and a user call processing server responsible for control plane management of the communications in said user server.

Still another aspect of the invention is a device for managing speech items in a communications system having a packet mode group voice communication feature, comprising a mechanism granting a speech item to one group member in a group communication group at time, a first timer responsive to said granting the start of the measurement of a predetermined idle period from said granting, a mechanism resetting said first timer each time a voice packet is received from said one of said group members, a mechanism ending said granted speech item if said first timer expires indicating that said predetermined idle period has elapsed from said granting or from the last voice packet received from said one group member.

Another aspect of the invention is a device for managing traffic streams addressed to a user who is active in at least one group communication group or in one-to-one communication in a mobile communications system having a packet mode group voice communication feature, said device comprising a first mechanism capable of receiving at least two voice packet streams related to at least two group or one-to-one communications, a second mechanism monitoring continuity of said forwarded voice packet stream, said first mechanism forwarding no other one of said received voice packet streams related to at least one further group or one-to-one communication, if said first voice packet data stream is continuous, and selecting and forwarding other one of said voice packet streams to said user if said previous selected and forwarded voice traffic stream has been discontinued for a predetermined period of time.

Still another aspect of the invention is subscriber equipment for a communications system having a packet mode group voice communication service, said subscriber equipment comprising mechanisms for packet data communication over said mobile communications system, a group communication application on top of said mechanisms, said application having a mechanism establishing a logical packet connection to a group communication server, said application having a mechanism sending and receiving voice packets to and from said group communications server.

BRIEF DESCRIPTION OF THE DRAWINGS

In the following, the invention will be described in greater detail by means of preferred embodiments with reference to the accompanying drawings, in which.

PREFERRED EMBODIMENTS OF THE INVENTION

The present invention is applicable to any digital communications systems which can be used as an access network allowing packet mode communication between end users and an overlaying packet mode group communication service. The invention is especially preferably used in mobile communications systems based on a GPRS-type packet radio. In the following, the preferred embodiments of the invention will be described by means of a GPRS service and the UMTS or GSM system without limiting the invention to this particular packet radio system. The IP voice communication method used in the preferred embodiments of the invention is the Voice over IP (VoIP), but the invention is not limited to this particular method.

Figure 1:
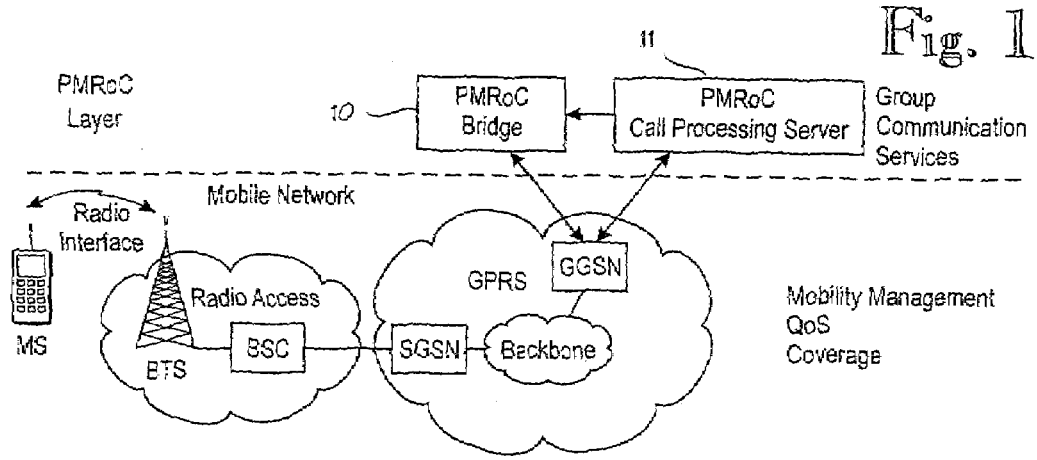
FIGS. 1, 2 and 3 illustrate the basic architecture of the invention.

FIG. 1 illustrates the basic architecture of the preferred embodiment of the invention. In the illustrated embodiment, a mobile radio access network (RAN) which provides the IP packet data service is based on a GPRS architecture utilizing a 2G radio access technology, such as a GSM base station system BSS with base stations BTS and base station controllers BSC. The GSM radio access may be conventional or based on the GSM EDGE technique. In the latter case, radio access may be referred to as GERAN which is an all-IP GSM radio access network. Alternatively, a 3G radio access network UTRAN (such as UMTS) may be used. An all-IP core network can be used both in GERAN and UTRAN. The architecture of the mobile network is not essential to the invention, but the GPRS infrastructure and operation will be briefly discussed in order to make it easier to comprehend the invention. The GPRS infrastructure comprises support nodes, such as a GPRS gateway support node (GGSN) and a GPRS serving support node (SGSN). The main functions of the SGSN are to detect new GPRS mobile stations in its service area, handle the process of registering new mobile stations MS (also called User Equipment, UE) along with the GPRS registers, send/receive data packets to/from the MS, and keep a record of the location of the MSs inside of its service area. The subscription information is stored in a GPRS register (HSS, Home Subscriber Server). The main functions of the GGSN nodes involve interaction with external data networks. The GGSN may also be connected directly to a private corporate network or a host. The GGSN includes PDP addresses and routing information, i.e. SGSN addresses for active GPRS subscribers. The GGSN updates the location directory using routing information supplied by the SGSNs. The GGSN uses the routing information for tunneling the protocol data units PDU from external networks to the current location of the MS, i.e. to the serving SGSN, in accordance with the GPRS tunneling protocol (GTP). Tunneling means that the data packet is encapsulated into another data packet during transfer from one end of the tunnel to another. The GGSN also decapsulates data packets received from MSs and forwards them to the appropriate data network. In order to send and receive GPRS data, the MS activates the packet data address that it wants to use, by requesting a PDP activation procedure. This operation makes the MS known in the corresponding GGSN, and interworking with external data networks can commence. More particularly, one or more PDP contexts are created and stored in the MS and the GGSN and the SGSN. The PDP context defines different data transmission parameters, such as PDP type (e.g. X.25 or IP), PDP address (e.g. IP address) and quality of service QoS.

In FIG. 1, a PMR-over-cellular (PMRoC) layer is provided on top of the mobile network in order to provide group communication services to the mobile stations MS through the mobile network. Conceptually, the PMRoC layer comprises a pair of basic logical entities, a PMRoC bridge 10 and a PMRoC call processing server (CPS) 11. The bridge 10 and the CPS 11 are connected to the GGSN, typically over an IP network. The bridge 10 and the CPS server 11 run PMR applications which communicate with the PMR application(s) in the mobile station MS over the IP connections provided by the-IP mobile RAN. This communication includes both signaling packets and group communication packets.

The CPS 11 is responsible for control-plane management of the PMR communications. Its important role may require various functionalities which in an embodiment of the invention are implemented in the following modules: "PMR server"—the application that handles the sessions for group memberships which are signaled with an appropriate session control protocol, such as SIP, established for the PMRoC communications, and manages the users profiles (call rights, group active membership, scanning settings, etc.); SIP Proxy/Location Server—providing user location and routing functionalities of SIP signaling; SIP Registrar—for user registration/authentication; and Media Gateway Controller—controlling the network entities involved in the IP layer data distribution according to the group & user specific information (membership, rights, scanning settings, etc.). However, in this description, the common term CPS refers to all possible functionalities of the CPS.

Figure 2:
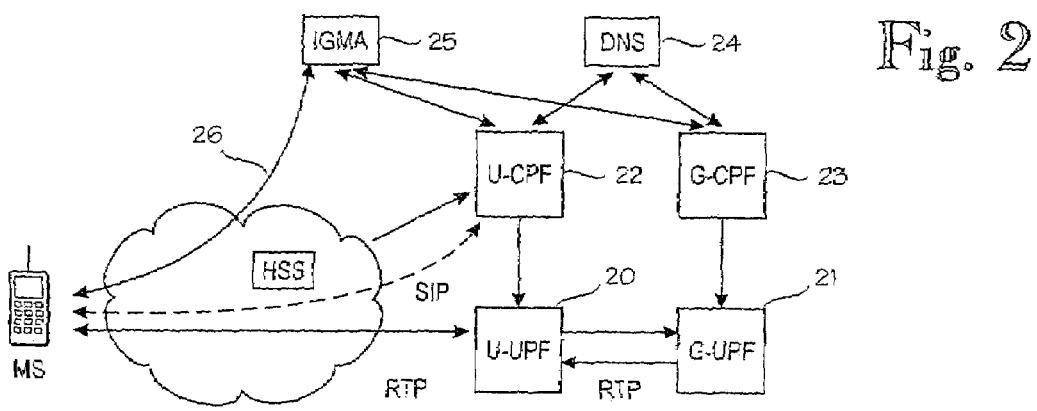

However, since the PMR management requirements can be divided into group and user specific ones, two kinds of CPS servers are defined in one embodiment of the invention, as illustrated in FIG. 2. The SIP sessions for group communications are handled by a Group Control Plane Function (G-CPF) (G-CPF) 23 (e.g. in a server). When a user attaches to a group, the G-CPF 23 takes care of the relative SIP invitation transaction and performs the proper mapping settings between the user's recipient and the network entities responsible for the relative traffic distribution. The User—Control Plane Function (U-CPF) 22 (e.g. a control plane proxy server) is basically the control plane interface between the IP network and the user. By this network entity the users log on to the system and negotiate their operational settings (call rights, scanning settings, etc.). It handles the user's profile and manages his one-to-one calls. It should be appreciated that this is just a logical separation, and both kinds of CPS can be situated in the same computer. Separating G-CPF and U-CPF enables users to join PMRoC groups handled by G-CPF in different Intranets or in mobile networks of different operators and IP domain. Division also brings scalability by allowing in practice infinite number of groups or users in the system.

Referring again to FIG. 1, the bridge 10 is responsible for the real-time distribution of VoIP packets to the users' terminals according to their group memberships, their scanning settings and eventual pre-emption or emergency cases. Each bridge forwards traffic only between valid connections programmed by the CPS. The bridge 10 may perform one or more of the following functionalities:

Input checking: to identify and authenticate the traffic source (optionally the mnemonics in the leader RTP packet, which will be discussed below, have to be processed here). Input checking may also include actions to perform and support security procedures.

Input filtering: to manage that only one talker talks in a group at a time (i.e. grants a speech item), and optionally to give priority to higher priority voice items.

Multiplication: after the filtering process, the bridge 10 has to check the active members of the group to which the traffic is destined and generate from the incoming packet a "downlink" packet for each active member.

Scanning filtering: to select from the multiple incoming traffic streams destined to the same user the one which has to be forwarded to his recipient according to the user's scanning settings.

Again, since input filtering and multiplication are group specific processes, while input checking and scanning filtering are user specific, the following two kinds of application bridges have been defined in one embodiment of the invention, as illustrated in FIG. 2.

Firstly, a Group-User Plane Function (G-UPF) G-UPF 21 (e.g. in a server) is a network entity to which group members' audio packets are sent (through their U-UPF) and where the input filtering and multiplication processes are performed. To each new group the G-CPF 23 assigns a single G-UPF 21 according to load balancing criteria which distributes the traffic as evenly as possible between the G-UPFs.

The User-User Plane Function (U-UPF) U-UPF20 (e.g. in a server) performs the input checking and scanning processes for the individual subscribers which have been assigned to it by the U-CPF 22. For security purposes the U-UPF 20 may have security associations for each mobile terminal it handles. The U-UPF 20 hides the network complexity from the mobile terminals, so the user has just to send all his user plane traffic to this unit that afterwards forwards it according to the mapping settings of the proper U-CPF 22. In this way there is no need to establish secure channels between each user and all the IP network entities which have just to trust the U-UPF 20 from which they receive packets.

As for the Control Plane elements, this logical splitting does not necessarily require a physical separation between the G-UPF and the U-UPF implementations, and thus they may be located in the same computer.

The U-CPF 22 and the G-CPF 23, which are responsible for managing the sessions of the users and the groups, respectively, require specific control plane signaling. ETSI 3GPP (European Telecommunications Standards Institute, 3rd Generation Partnership Project) specifications include IP based voice communications in a so called all-IP network. Such an all-IP network enables also voice communication in IP network (voice over IP, VoIP). For VoIP, call control signaling is specified, such as the Session Initiation Protocol (SIP), which is defined in the RFC2543. Therefore, in the preferred embodiment, the SIP has been chosen to support and manage the PMRoC call sessions. However, some other IP session protocol may be used instead. Further, in the preferred embodiment of the invention, Megaco (defined in RFC28859) is used by the G-CPFs 23 and the U-CPF 22 to control the G-UPFs 21 and U-UPFs 20 involved in traffic distribution of the IP layer. However, some other corresponding protocol for controlling the switching of the user plane elements may be used instead. Still further, the RTP (Real Time transport Protocol) protocol has been chosen to handle the transfer, and QoS mechanisms are needed to handle the voice packet (VoIP) delivery.

Megaco defines a general framework for physically decomposed multimedia gateway. Its connection model is based on two main abstractions which are Termination and Context. The former is a logical entity in the MGW (i.e. PMRoC Bridge) that sources and/or sinks one or more streams, while the latter is an association between a collection of Terminations that describes the topology (who hears/sees whom) and the media mixing and/or switching parameters if more than two Terminations are involved in the same association. Priority values can be used by the MGC (i.e. PMRoC CPS) in order to provide the MGW with information about a certain precedence handling for a context, and an indicator for an emergency call is also provided to allow a preference handling. The protocol provides commands for manipulating the logical entities of its connection model, contexts and terminations, and it is here assumed that it provides the flexibility and the functionalities required by the PMR CPS 11 (the G-CPF 23 and the U-CPF 22) to program the proper traffic paths and filtering/scanning processes in the PMRoC Bridge 10 (the G-UPF 21 and the U-UPF 20).

The SIP protocol defines signaling messages for call control, user location and registration, and these have been used in the preferred embodiment of the PMRoC solution to handle the specific PMR communications and the relative participating users (establishment, joining and tear down of a call session, user's log on to PMRoC services, user's profile negotiation, etc).

For each PMRoC communication, a SIP session is established and managed by the CPS handling it (G-CPF 23 and U-CPF 22 for group and one-to-one communications respectively). When a user wants to become an active member of a group, he has to join the corresponding session. For individual calls, the PMRoC U-CPFs maintain one session per user for all individual calls. This individual call session is always on when the user is logged on to PMRoC services and the user has selected individual call service to be in use.

All the user's outgoing and incoming traffic has to go through the U-UPF 20 that has been assigned to the user by his U-CPF 22. In particular, in the uplink the user's traffic is checked by his U-UPF 20 and forwarded to the G-UPF 21 handling the group to which the traffic is destined or, in case of one-to-one communication, to the U-UPF 20 handling the called party.

In the downlink, the traffic is then distributed to the destination users' UProxies 20 (by packet multiplication in the G-UPF 21 in case of group communication) where the users' scanning processes are performed and from where the traffic is delivered to the recipients.

This PMRoC solution is access independent, which means that it can run on top of GSM, WCDMA, WLAN or equivalent technologies as long as these are able to support the always-on VoIP bearers. The IP layer's audio distribution uses standard VoIP mechanisms (such as the RTP), while specific Internet protocols or interfaces will be used to connect supplementary network entities, such as database and billing subsystems 26, a domain name server (DNS) 24, WWW/WAP (World Wide Web/Wireless Application Protocol) and security management servers 25. Each network entity is obviously associated with at least one IP address by which the IP packets are transferred and routed, but the role of the network elements have also to be defined from the SIP's point of view. Each MS is a SIP User Agent (UA), and thus each one needs a SIP address which normally is "user-name@domain(host?)-name" where the hostname is associated with the U-CPF 22 in which the MSs have to register. This U-CPF 22 should act as a Registrar, Location and Proxy SIP server in order to allow the reachability of the MSs under his control and to support the SIP signaling routing. The G-UPFs 21 and U-UPFs 20, which are exclusively involved in the audio data distribution do not have a role in the actual SIP mechanisms and the core network is simply seen as a single IP network link. At the SIP signaling level, URLs are used for user and group identification. The URLs can be sip: URLs as defined in the RFC2543, tel: URLs representing telephone numbers as defined in the RFC 2806, or any other URL formats. The REGISTER method is used with a sip: URL. Dialing of users with a private numbering plan number (only) is possible using the tel: URL in the To: header field (sip: URL must have the host portion present at all times). This could be used for example for addressing the b-party for one-to-one calls if the b-party is from the same virtual private network (VPN). Groups are always addressed with sip: URLs, where the group name is used in place of the user name, and the domain managing the group (exact CPS server, if known) in the host portion. The addressing on the user plane will be explained in more detail below.

The user equipment, or mobile station MS, has a PMRoC application on a user layer on top of the standard protocol stack used in the specific mobile communications system. The SIP and RTP protocols employ the underlying TCP, UDP and IP protocols which further employ the physical layer resources, such as the radio resources. Additionally, a WAP stack may be employed to access the WAP pages on the group management server.

Figure 3:
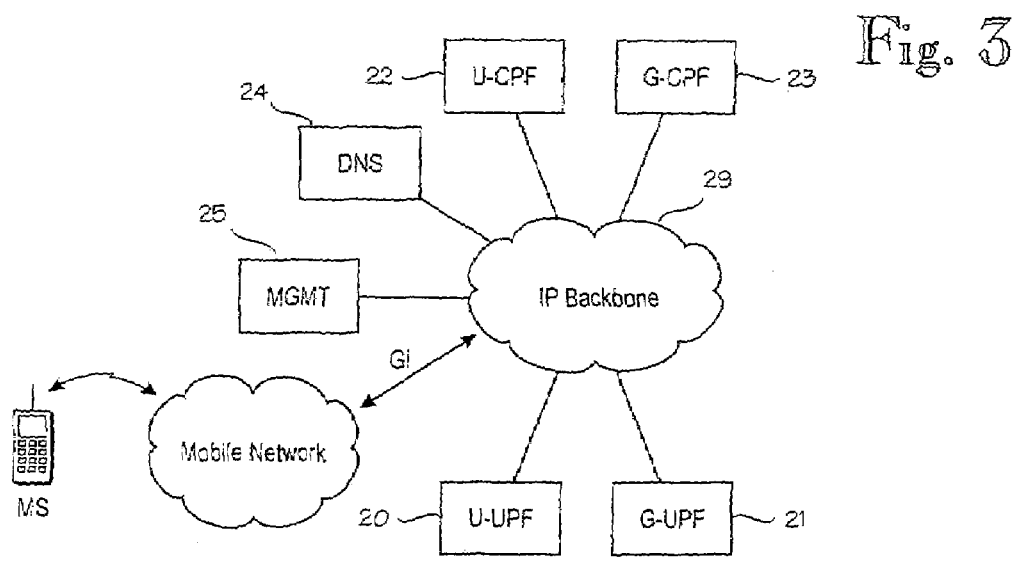

In FIG. 3, one possible general PMRoC architecture is presented. The IP backbone 29 may be, for example, an IP mobile backbone, a LAN, a PMRoC intranet, or two or more separate intranets, etc.

PMRoC mobiles MS, when the PMRoC mode is selected by the user sets up two GPRS contexts: a) one to the PMRoC CPS 11 to be used with TCP/IP for group management, b) one for voice to/from the PMRoC bridge 10 using RTP, UDP, conversational IP quality class or similar, and sufficient header compression over the radio path. If a mobile or the mobile network do not support two simultaneous contexts, the mobile must clear down the RTP connection for the duration of the SIP signaling transaction. The PMRoC mobile MS must always maintain the contexts to the bridge 10 when the PMRoC mode is on. The SIP content is also preferably on all the time, but if this causes problems to network capacity or to the accessibility of other services than PMRoC, the SIP context can be set up also for the duration of signaling transactions. Notice: in this case the cellular network must support the network initiated context set up. The SIP sessions are signaled in power on or in PMR mode activation. The SIP sessions are always on and thus no SIP signaling is needed for PMR voice items. All voice is transmitted after PTT activation via the existing contexts. This mechanism enables fast call set up.

Figure 4:
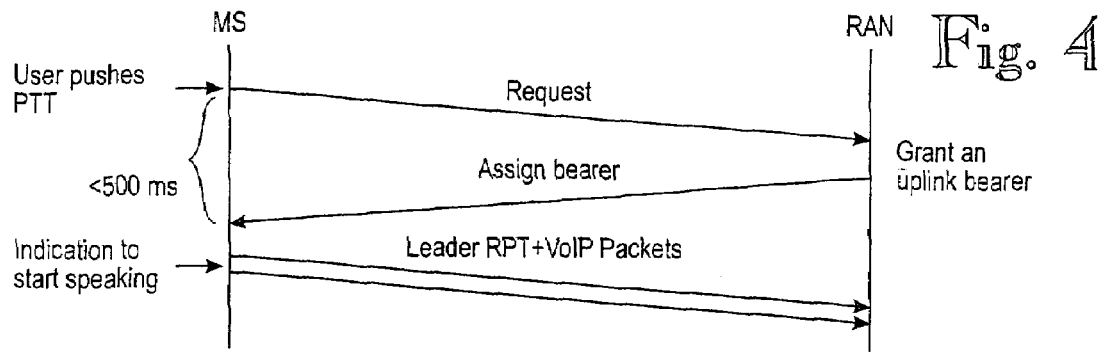
FIGS. 4 and 5 are signaling diagrams illustrating the allocation of uplink and downlink bearers, respectively, in the radio interface of a mobile network.

The allocation of the uplink bearer at the radio interface of the mobile RAN is illustrated in FIG. 4. The user pushes the PTT and the MS sends a speech item request to the mobile RAN. The MS will ask for a dedicated radio bearer for the duration of whole speech item. The mobile RAN grants the uplink bearer (e.g. a dedicated packet data channel and the physical time slot). When the mobile RAN acknowledges allocation of the uplink bearer, the mobile starts sending data through it. The first packet sent is an RTP message containing the talking party mnemonic identifier followed by voice stream packets (VoIP packets). The leader RTP packet and the VoIP packets are routed to the PMRoC bridge 10 on the basis of the active GPRS context.

Figure 5:
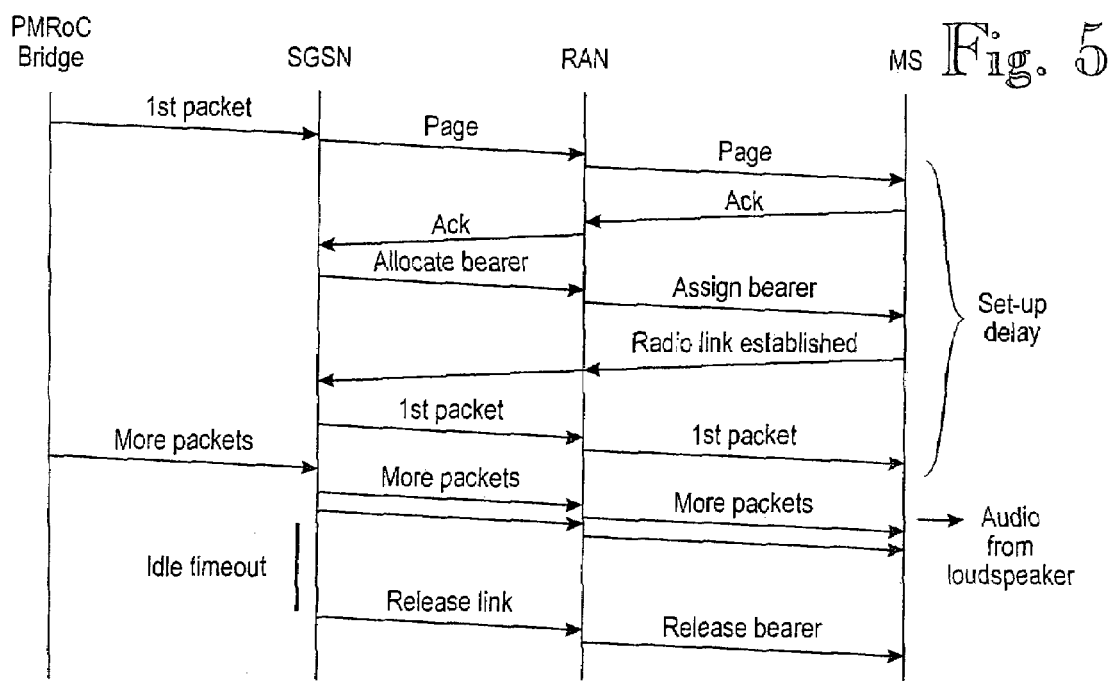

The PMRoC bridge 10 multiplies the packets and sends them to the other members of the group. The allocation of the downlink bearer in the radio interface of the mobile network is illustrated in FIG. 5. The downlink bearer is allocated by the SGSN when it detects an IP packet going via an existing context to a mobile station MS. Firstly, the SGSN pages the MS if it is in a STANDBY state. After receiving an acknowledgement from the MS, the SGSN requests that the RAN (e.g. the GSM BSS) allocates a dedicated radio bearer, and after the allocation the SGSN starts sending packets (e.g. in LLC frames) to the RAN. The RAN sends the packets (e.g. in radio blocks) to the MS.

The uplink voice bearer is released by the MS when the user stops pushing the PTT switch. The network will release the uplink bearer when the maximum speech item length (e.g. 20 to 30 sec) is exceeded. In the downlink direction the radio network should release the bearer when no IP messages associated with the bearer have been received for a predetermined period of time (so called idle timeout).

The call set up delay experienced by the caller after pressing the PTT switch may be shortened by the mobile station MS giving an audible indication to the user to start speaking. After the audible tone, the user can start speaking and the VoIP message starts. This is the time the caller experiences as the set up delay. There are several points at which the permission to speak can be given. One suitable point is after the uplink radio bearer has been allocated and after the first RTP message (so called Leader packet, non-voice) has been sent to the RAN. Notice that the downlink status is not known at this point. In case of call failure because of a missing B party or missing radio bearers in the downlink direction or a failure of a-call authorization check, the user gets an indication of a call failure. The indication to speak could be alternatively given after the bridge 10 gives an acknowledgement of, for example, having processed the first RTP packet or even of the B party having acknowledged the header packet. Still alternatively, the MS could have a timer value set by the CPS from sending the lead packet to giving the audible indication to the user.

Group Communication

Groups (also called talkgroups) provide the users with an easy and immediate multipoint way for voice communication. Each user can be allowed access to one or more groups. A typical case is that a mobile user is allowed access to all groups in his Virtual Private Network (VPN). The user is actively attached to a subset of the available groups.

In the basic mode, the mobile user selects one group for communication. He will then hear all traffic in that group (unless he is engaged in an individual call) and can also himself talk in the group. The user can easily switch to another group.

The user can also operate in multiple groups virtually at the same time, by using a method called scanning. The user selects multiple groups and assigns these with priorities. He then hears traffic from one group at the time, but traffic from a more important group will interrupt other traffic. One of the groups remains the selected group, and any speech transmission by the user is made to the selected group. The user can switch scanning on and off. The list of scanned group with priorities can be edited by the user. Group selection and other settings can also be performed remotely.

The user interface for receiving and talking in groups, changing the selected group and activating scanning needs to be simple and fast. Other tasks, such as defining the scanning list are used less often.

PMR-Style One-to-One Communication

As an option, the architecture according to the invention can be used to enable the users to make direct one-to-one calls to other users within their defined access rights (default: within their VPN). A direct one-to-one call resembles the use of an intercom rather than the use of a normal telephone.

Such calls are well suited to many PMR users: tasks, commands and advice can be given and received with minimal attention to operating the mobile station. Activities can be coordinated with good timing accuracy without having to keep a call on during long periods. Basically, an one-to-one call is only a special case of group communications, and the same principles can be used.

Control Plane Operation

In the following, the preferred embodiments and different aspects of the invention are discussed on the control plane and the user plane of the PMRoC.

Group Management

There are various objects for group management. Group management must be possible from PMRoC radios. Users must be able to browse the possible groups and subscribe to them. They must also be able to leave the groups. For more professional use, forced joining and removal to/from groups is needed. It is desirable that the group management be produced via a WEB/WAP browser based service.

Groups need to be created before they can be used for communication. Creating groups and defining their membership belongs to what is called group management. Many user groups are expected to outsource the group management, but some will prefer to have access to creating groups and defining group members. On the other hand, not all users need to create new groups (e.g. ordinary workers using PMRoC). Therefore, it is better to conceive the group creation/management application as separate from the PMRoC communications application. In the preferred embodiment of the invention the users have a remote access 20 to a central group management application GMA provided by the operator in the group management server 25 shown in FIGS. 2 and 3.The GMA may provide a group managing user interface using WAP/WWW forms. However, other types of user interfaces are also possible.

Figure 6:
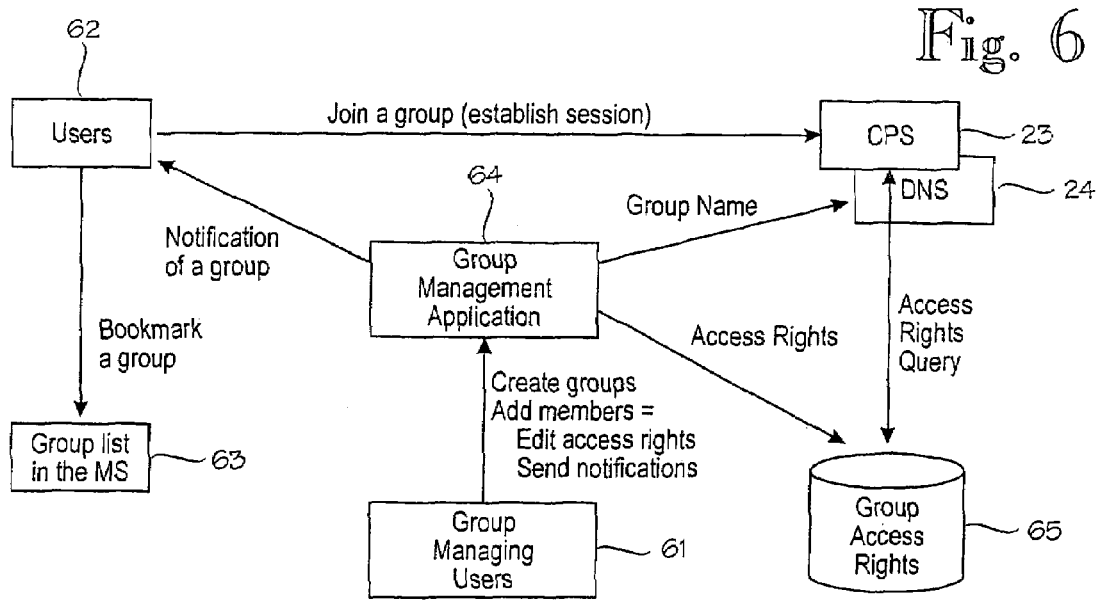
FIG. 6 shows an overview of a group management concept.

An overview of the group management concept is shown in FIG. 6. Group management is used by group managing users to create groups for the use of users 62. The users 62 can be actively engaged in a group (an active group session is established) or they can have groups bookmarked in the group list 63 of their MSs for easy use later. Furthermore, the users 62 can have been allowed access to yet other groups. A user 62 can activate a session in such groups, e.g. by typing the url of the group (such as 'football@publicgroups.operator.fi') or clicking a link on a web or wap page. The group managing users 61 can be either 1) normal users creating or modifying groups for personal or business use, 2) office personnel creating or modifying groups for company use, 3) dispatchers creating or modifying groups for their PMR fleets, or 4) operator or service provider personnel creating or modifying groups for their customers' use. A Group Management Application (GMA) 64 run in the group management server 25 allows these users 61 to create groups, define and modify group access rights, and send notifications about new groups to users.

First of all, the group management application (GMA) must hold information on authorized group management users and what they are allowed to do. The information may include settings like: 1) which operation the group managing user is permitted to use (e.g. create, add/remove access rights, send notifications); 2) which groups he is allowed to manage (e.g. own private groups, any groups of company-k, any public groups of provider-x); and 3) which users he is allowed to include (e.g. any, any users of company-k, a list of persons) in the groups.

Then let us consider a case wherein an authorized group managing user 61 creates a group. In the preferred embodiment of the invention, the group data created at this point may include: 1) the home CPS 23 of the group; 2) the URL of the group (dependent on the home CPS 23); and 3) the initial access rights settings for the group (can be changed later). The group creation/management application GMA may now perform e.g. the following actions: 1) update the DNS server 24 of the url if necessary (typically there should be no need if existing domain names are used); 2) update the CPS 23 with the group name; 3) and update the group access rights database 65.

The group managing user 61 may at this point also want to send a notification of the new group to potential group members. For instance we can see the following typical cases: 1) the group managing user 61 is a private person who has created a group for five persons he knows, access to the group has been restricted to these five persons, and the user wants notification to be sent to these five persons; 2) the group managing user is a service provider who has created a group for hobbyists, access to the group has been set open to all, and the notification is sent to a list of users who according to marketing research are likely to be interested.

The notification of a new group is, for example, a special form of SMS message (e.g. ringtones, logos). The group management client application in the MS may react to this message by e.g. 1) displaying to the user that a new group is available to this user; 2) giving the MS user a choice of joining immediately (starting an active session; normal or sticky) or bookmarking for later use, or rejecting (a reject message will be sent to the group creation/management application GMA which may display it to the managing user). The rejection indicates to the group creation/management application that the user does not accept the group, but this does not necessarily have to result in modifications to access rights data.

As noted above, new groups will be added by the Group Management Application (GMA) to the relevant G-CPF 23. Likewise the GMA can also delete groups. The G-CPF 23 is not directly involved in creating groups otherwise. When notifications are sent to users, the users who wish to join the group immediately appear to the G-CPF 23 as users establishing a SIP session to a group. The G-CPF 23 inquire group access rights from the access rights database 65.

The removal of a user's group access rights affects only the group access rights database 65. Any ongoing sessions are therefore not affected, and the change becomes effective at the next session set-up. If a user has to be removed from a group, a separate facility for that may be implemented to the G-CPF 23. The deletion of a group is indicated by the GMA to the appropriate G-CPF 23. The G-CPF 23 will then end all active sessions and remove any stored information on the group. The GMA optionally also takes care of removing information in the group access rights database 65, and sending removal notifications.

Group access rights are checked by the CPS at the time when a group session for user equipment is started. Additional checks can be made at other times if deemed necessary to maintain security. In the preferred embodiment of the invention, the group access rights are held in the database 65 which is then inquired by an appropriate server. The typical inquiry takes the form "is user-x allowed to access group-y?".

The access rights definition should be flexible and possible both on the level of individual users/group and on lists of users/groups. For instance, one should be able to define: 1) user-x allowed to access group-w; 2) user-x, user-y, user-z allowed to access group-w; 3) user-x allowed to access all groups of company-k; 4) all users of company-k allowed to access group-z; 5) all users of company-k allowed to access all groups of company-k; 6) all users allowed to access group-p; 7) etc.

Therefore, the access management preferably uses a hierarchical structure for both users and groups. This means that users can belong to user groups and groups can belong to group groups, even on multiple levels. It would also be even more flexible if a single user could belong to multiple (parallel) user groups. Group access can be given to a specific user or to a user group. Access given to a user group admits all users in that user group. A user can be given access to a specific group or to a group group. Access to a group group admits into all groups in that group group.

User Operation in Groups

User Log on to PMRoC Services

Before the user can start to use PMRoC services he has to register himself with his U-CPF 22 whose address has to be determined by DNS services. In the preferred embodiment of the invention the user first makes a DNS query containing the domain part of his SIP address. The DNS 24 returns the IP address of the U-CPF 22 corresponding to the domain part.

Figure 7:
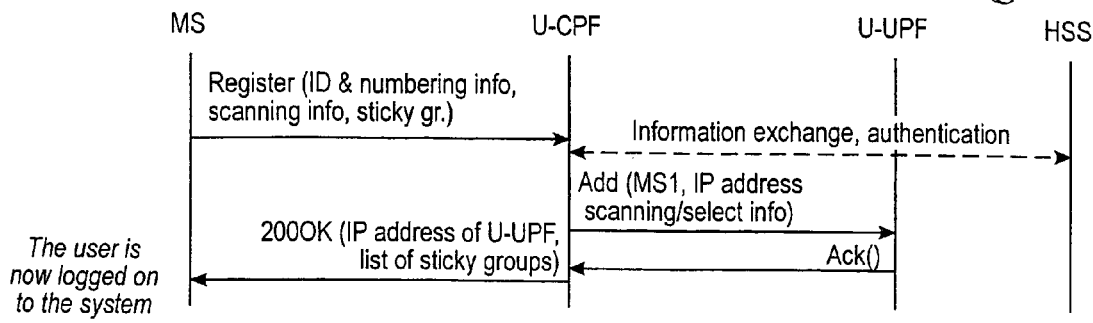
FIG. 7 is a signaling diagram illustrating user log-on to PMRoC services.

Referring to FIG. 7, once the MS knows the IP address of the U-CPF 22 it sends a SIP registration message to the U-CPF 22. When the U-CPF 22 receives the registration message from the user's MS it has to select and assign a U-UPF 20 to the user where his input checking and scanning filtering process has to be performed and where the user has to send his user plane traffic. The user is then added to the selected U-UPF by an Add message, and the U-UPF initializes the user's scanning process and sends an acknowledgement. Optionally, before selecting the U-UPF 20, the U-CPF 22 may exchange user information with the Home Subscriber Server (HSS) of the user, authenticate the user and create a user profile.

During the first registration the user gets the IP address of his U-UPF 20, and in case the user is allowed to have one-to-one calls the U-CPF 20 implicitly invites the user to the SIP session already established for the one-to-one communications of the users handled by the same U-UPF 20.

The registration message normally includes the identification information of the user, but the message can also include other relevant indications and it can be re-sent several times by the user in order to update his profile or to request particular information to his U-CPF 22.

In order to avoid the log-on of different users to the system by the same terminal, which would require more than one scanning processes for the same IP recipient, a specific checking mechanism may be performed by the U-CPF 22.

In case the user wants to activate his membership to his eventual sticky groups (joining the corresponding SIP sessions), or he wants to select a group (in case of scanning being set off), or he needs to update his scanning settings or even to set ON/OFF his scanning process, then he can send new specific registration messages to his U-CPF 22. Afterwards the U-CPF 22 performs the consequent operations required, such as SIP session invitation, mapping settings in the G-UPFs 21 and the U-UPF 20, and finally provides the resulting information (for example the list of the sticky sessions which the user has implicitly joined) to the user in the response message.

Active Group Sessions

A user communicates (listens and talks) in groups for which he has -an active session. Sessions are set up and ended by SIP signaling. The session setup can be initiated both by the user or by an authorized third party (such as a dispatcher or an application). Session establishment by a third party is mainly relevant in PMR use. Many users, especially in the non-PMR market are likely to dislike session establishment by a third party and may like to be able to prevent this user by user. The sessions may also be forcibly ended by the G-CPF 23, e.g. in case of group deletion.

The primary and effective data on the active group sessions is always held by the server(s). Thus, even if the user equipment (e.g. the MS) has lost data on an active group session, it might receive traffic from the group. The MS may, based on incoming traffic from a group for which it has no session, recover from the loss of data and re-establish the session (either locally or with SIP).

In many applications the user may continue using the same groups after a power-off period. For this purpose, sticky sessions are to be provided. When the user is logged off, the sticky sessions will be remembered by the U-UPF 20, and re-established at power on.

For activating a group session, the MS needs to know the url of the group. From the user's point of view, he may (user decision, depends on what options have been implemented) select the group by 1) typing the full url of the group (e.g. Setter2@hkl.grpcps.operator.fi, football@publicgc.operator.fi).

2) selecting from groups stored in the MS in a group bookmark list.

3) using a WAP/WWW application to browse available groups.

All these methods are complementary and can be compared to corresponding methods in web browsing: typing the url, selecting from the bookmark list, clicking on a link on a web page. The outcome in all three cases is that the MS knows the url of the required group and can start SIP signaling.

Setting up a session by the user may (if this facility is implemented and the user decides to use it) be based on an URL of the group given by the user. This allows any user to try access to any group; access rights checking will then be performed by the server(s). Another method for occasional access to groups would be using a web/wap browser to browse for interesting and/or useful groups. Both of these methods are very suitable to occasional and temporary access to groups.

However, if the user needs frequent access to some groups without having to keep the session open all the time, the user equipment may include some form of group list. The main purpose of the group list is to allow the user to browse locally the list of groups and easily select and change groups. Please note that there is no need for the group list in the user equipment to be complete and include all groups available to the particular user. If a group is missing, the user can access the group by giving its URL and then store it on the list.

From the user's point of view, the group list may be perceived as the traditional PMR group or channel selector. Other types of users may perceive the list as a second phone book, an internet bookmark list or similar to TV channel settings. This set of models is enough to cover all likely users of the service.

There are a few options as to how the group list works, depending on the type of the intended market (PMR or consumer). For PMR, the user interface should resemble a traditional PMR group list, and a facility to remotely load new groups to the group list (from a system manager) will be needed. For consumer users, the user interface might resemble more a bookmark list to which the user can add groups himself (e.g. bookmarking the group currently selected). A PMR user would naturally also benefit from the facility of bookmarking the current group. At this stage, we can assume that the deletion of groups from the list is the user's responsibility. For PMR users, automatic bookmarking could be useful, i.e. that all new groups will automatically be bookmarked.

Signaling a PMRoC Group Speech Item

The user has to send all his user plane traffic to the U-UPF 20 assigned to him by his U-CPF 22, and in case the traffic is destined to a group then the specific port number associated by the U-UPF 20 with the group is used for traffic identification purposes.

One common PMR requirement is that only one active member at a time is allowed to speak in each group and that means that a user willing to speak to a selected group has to get a speech item that is managed by the system. The speech items are granted and rejected by the G-UPF 21.

The straightforward way to support this functionality would be to use SIP signaling, but in order to avoid the delay introduced by the explicit signaling transactions an alternative solution that uses the payload type field of the RTP packet for implicit signaling is here preferred.

Figure 8:
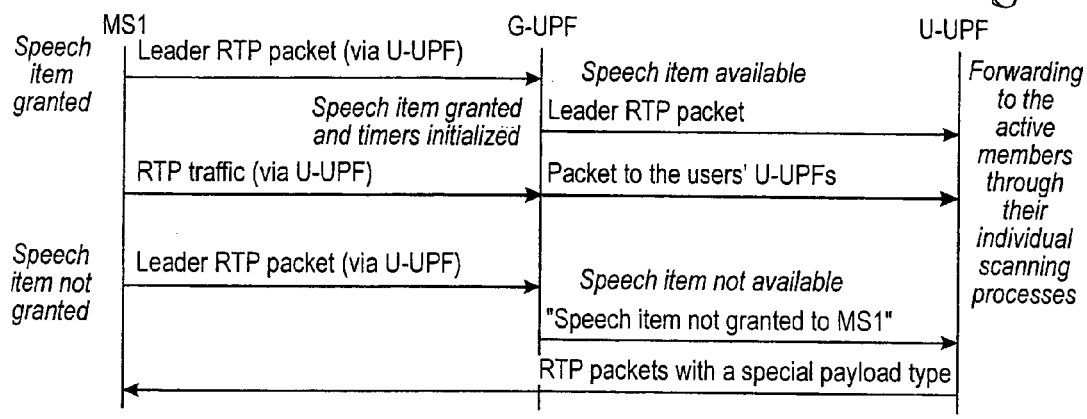
FIG. 8 is a signaling diagram illustrating signaling relating to the management of a group speech item.

With this implicit signaling approach each user can try to speak to the selected group whenever he wants. Referring to FIG. 8, when the user of the MS pushes the PTT, the uplink resources are reserved as described above, and the MS sends a leader RTP packet to the G-UPF 21. A speech item is available and granted to the MS. At the same time, timers which are to be described below are initialized. The leader RTP packet is forwarded to all the receiving active members of the group via their respective Uproxies, in order to indicate the current speaker's identity to all the receiving active members of the group each time an active member gets the speech item and starts to talk to the group. This leader packet uses a special payload type (defined for this special purpose), to carry information about the sender's identity (mnemonic, number, etc.), and an SSRC value that will be used to recognize the following RTP packets sent by the same speaker. Then the leader RTP packet is followed by the actual group's audio stream (RTP traffic, VoIP packets).

Normally, when the speech item is not available and the G-UPF 21 does not grant the speech item to a user in response to receiving the leader RTP packet, the user notices that his voice is not forwarded when he receives another member's voice from the same group traffic. However, this would not be enough in case the user is simultaneously listening to another group, so the G-UPF 21 of the group has to signal to the user's U-UPF 20 (using a suitable control protocol) that the user has not got the speech item requested. The user's U-UPF 20 will then forward to the user the next RTP packets from his currently listened to traffic with a specific payload type (pre-defined for this purpose) in the RTP header. This special payload indicates to the user terminal that the speech item was not granted to him. This special payload does not affect the audio signal playout in the user terminal (i.e. the MS) but allows to switch on some hardware mechanism (such as visual or sound indication) to alert the user.

Since the speech item is managed by implicit signaling, there is no need for further specific explicit signaling during a group communication.

Each U-CPF 22 generates unique SSRC values for the users it handles. During the first registration the U-CPF 22 returns this SSRC value to the user and stores it in the U-UPF 20 assigned to the user. It should be noted that in this context the SSRC uniquely identifies the user as a PMRoC subscriber while the different SSRC associated by the U-CPF 22 to the user's one-to-one calls indicates both participants of the call, the caller and the called party.

The user's traffic forwarded by his U-UPF 20 is then identified by the IP address of the G-UPF 23 that is handling the group to which the traffic is destined, and the specific port number that the G-UPF 23 has allocated for the traffic of that group.

Talkspurt Timers in Input Filtering

Traffic in a group, as seen by the users, consists of talkspurts (i.e. speech items) of more or less continuous speech coming from a specific user. The UProxies 20 and G-UPFs 21, however, receive packets of speech, and multiple users may try to speak simultaneously in the same group. To ensure that speech from the current speaker in the group is not interrupted or interfered with by packets from other users, the G-UPF 21 implements a talkspurt continuity timer for each active group. In addition to the timer, the identity of the currently talking user is stored.

In a typical talkspurt, while the user is pressing PTT, his speech codec is generating speech packets (frames) and these are being sent at regular intervals. Of course, the packets will reach the G-UPF 21 at somewhat more irregular intervals. Even when the user is not speaking, the MS will be sending DTX packets (Discontinuous Transmission). The timer is thus needed to keep a soft state between packets. The timer is restarted for every incoming packet, and the timer value should be enough to allow for the interval between packets, taking into account the interval between packets sent (e.g. DTX frames) and the variation of delay between the user and the bridge 21. The timer value is thus on the order of hundreds of milliseconds.

The idea is not to keep the turn reserved for the user if he releases the PTT. Therefore, an embodiment of the invention uses a trailer packet to signal the end of the talkspurt, and this should then be considered equivalent to the expiry of the timer. The talkspurt continuity timer is implemented in G-UPF 21, because it is there that different talkers are contending for talking in the same group.

There is also a requirement to limit the maximum talkspurt time. From the user's point of view, no single user should be able to occupy the group unnecessarily long, preventing others from talking. Neither should the group be blocked if the PTT of a user is unintentionally jammed in the send position. The operator may want to restrict the talkspurt duration for reasons of profiling the service and tariffing. Typical values for the talkspurt maximum timer would be 30s, 60s, even more. The timer is started at the first packet, when the user becomes the current talker. At the expiry of the timer the talkspurt of the current speaker will be stopped, even if there is no other speaker. To be able to talk again, he will need to release the PTT and push it again. A special packet is sent by the G-UPF to the MS in order to stop the sending.

It is possible to implement the talkspurt maximum timer either in the U-UPF 20 and in the G-UPF 21 or in both, but the result is not the same in the two cases. A timer in the U-UPF 20 implements a user specific maximum talkspurt duration, a timer in the G-UPF 21 implements a group specific maximum talkspurt duration. Either of these can be useful, even both. The architecture supports both.

Figure 9:
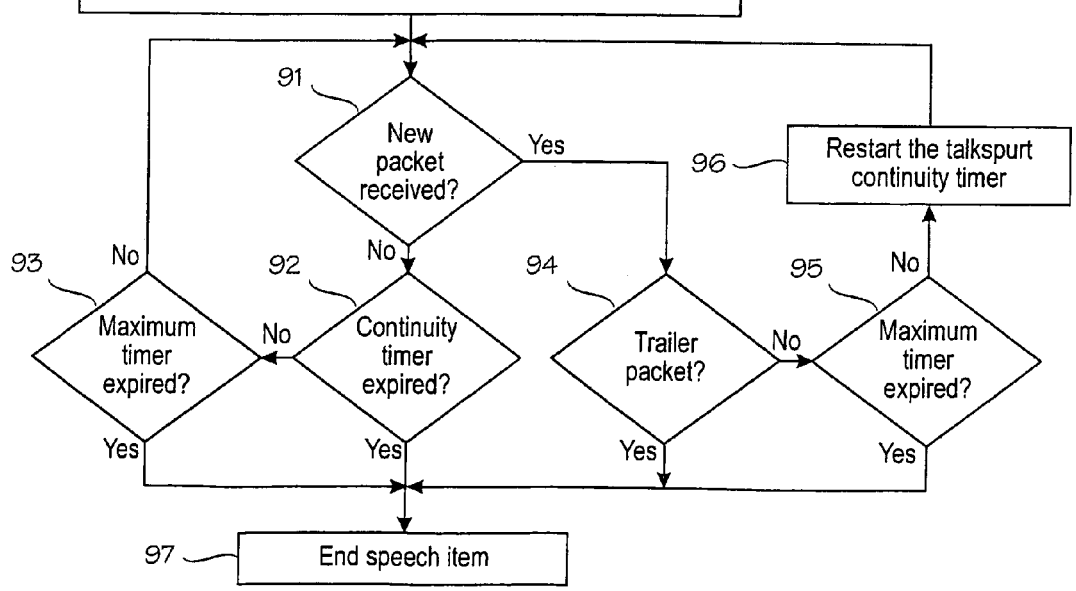
FIG. 9 is a flow diagram illustrating the management of a PMRoC group speech item by talkspurt timers.

FIG. 9 is a flow diagram illustrating the talkspurt timer process in the U-UPF 20 and/or in the G-UPF 21. The talkgroup continuity timer and the talkspurt maximum timer are started when a speech item is granted to a user, step 90. In step 92, it is checked whether a new packet has been received from the user. If not, it is checked whether the continuity timer has expired (step 91). If the continuity timer has expired, the speech item is ended (step 97). If the continuity timer has not expired, it is checked whether the maximum timer has expired (step 93). If the maximum timer has expired, the speech item is ended (step 97). If the maximum timer has not expired, the process returns to step 91. If a new packet has been received from the user in step 91, it is checked whether the received packet is a trailer packet sent by the user equipment in response to a release of the PTT (step 97). If a trailer packet has been received, the speech item is ended (step 94). If the received packet is not a trailer packet, it is checked whether the maximum timer has expired (step 95). If the maximum timer has expired, the speech item is ended (step 97). If the maximum timer has not expired, the talkspurt timer is restarted (step 96) and the process returns to step 91.

A mechanism to interrupt a talkspurt may also be needed. This could be when an authorized user needs to override an ongoing talkspurt. A G-CPF 23 may then be able to command the G-UPF 21 either 1) to interrupt a talkspurt in group_x, or 2) to set user_x to have an interrupting priority in group_x. In case 1, any ongoing speech item in group_x shall be interrupted, current_talker set to NULL and a command to stop transmitting be sent to the MS of the interrupted talker. In case 2, a speech item from the prioritized user will cause sending of a stop transmitting command to the previous talker, restarting of the talkspurt timers and setting the current_talker field to the new talker. It is assumed that interrupting priority is only used temporarily, on demand or in special cases. Therefore, the number of users with interrupting priority per group does not have to be large (assumption=1).

In the preferred embodiment of the invention, the command to stop transmitting is achieved by the use of an RTP packet using a special payload. A parameter field in this packet may indicate the reason for command. These packets shall pass through any filtering processes unhindered. An MS receiving the command to stop transmitting immediately stops transmitting voice packets and return to the receive state, as if the PTT were no longer pressed. The user will start to hear any incoming voice traffic even if he holds the PTT pressed. To start transmitting again, the user must first release the PTT and press it again. The command to stop transmitting is either generated or routed via the U-UPF 20. After sending the command to the MS, the U-UPF 20 suppresses any upstream voice packets for a predetermined period of time.

Downstream Suppressing While Transmitting

Figure 10:
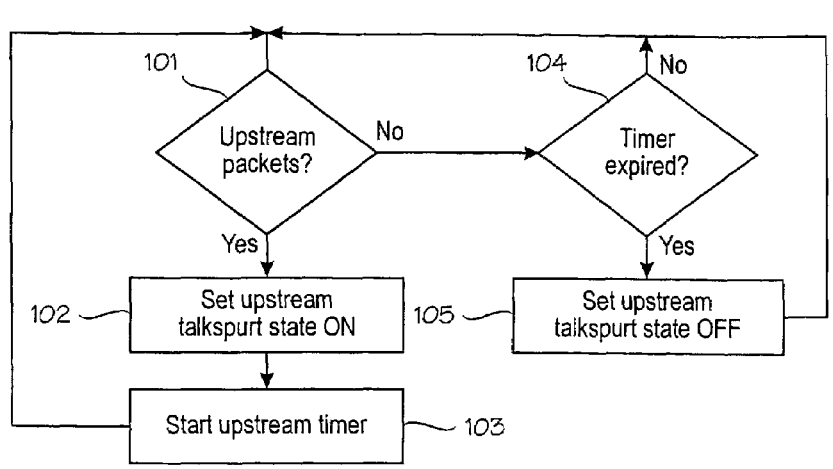
FIG. 10 is a flow diagram illustrating the downstream suppression by an upstream timer.

The semi-duplex mode of operation makes it undesirable to load the downstream channels with voice packets while the user is transmitting. Therefore, in an embodiment of the invention, the U-UPF 20 implements a suppression of downstream while transmitting in the following way. Referring to FIG. 10, the upstream traffic from the user is monitored for leader and voice packets (step 101). An upstream talkspurt timer shall be used to provide a soft state indicating that the user is transmitting a talkspurt. The mechanism used is the same as described above for maintaining talkspurt continuity in a group. An upstream voice or leader packet will set the upstream talkspurt state ON (step 102), and start the upstream talkspurt timer (step 103). Expiry of the timer (step 104) will set upstream talkspurt state OFF (step 105). When the upstream talkspurt state is ON, no downstream packets (except signaling) is sent to the user. When the upstream talkspurt state is OFF, downstream packets are sent normally.

User Plane Outline

At the user plane the audio data real-time distribution to/from the end users is handled, and the PMRoC Bridge 10 (the G-UPF 21 and the U-UPF 20) is the network element responsible for that. When multiple bridges/proxies are involved in the same PMRoC communication, their work is controlled and coordinated by the PMRoC CPS 11 (the G-CPF 23 or U-CPF 22) that is handling the corresponding SIP session.

It is an object of the invention that the PMRoC approach is scalable to millions of users and at least hundreds of thousands of groups. To provide a scalable PMR solution a specific addressing model has been planned. The principal aim of this model is to implement the complex mapping between the bridges, the users and their traffics using the strictly needed amount of IP addresses and port numbers and preferring static allocations (where possible) in order to reduce the amount of information to be exchanged between the network entities.

The IP/UDP/RTP protocol stack is commonly used in the VoIP world for real-time audio data transmission, and thus it is selected for the user plane in the preferred embodiment of the invention as well.

In particular it is assumed that at least in the users' terminals the IPv6 is implemented, while in some core network entities it could be required to support the IPv4 also (dual IPv6/v4 stack) in order to assure the interoperability with eventual subnetworks still using it.

The Real-Time Transport Protocol (RTP) developed by the IETF to support the transport of real-time streams for audio communications over packet networks is used on top of the UDP in order to avoid the delays introduced by more reliable transport protocols (not required in this context), such as the TCP. With the RTP and latency buffering at the receiving endpoint, the timing (jitter problem), packet ordering, synchronization of multiple streams, duplicate packet elimination and continuity of the streams can be handled.

When a user speaks to a group, the user's MS sends the audio packets to his U-UPF 20 which after the input checking forwards it to the group's G-UPF 21. The traffic forwarded by the U-UPF 20 is uniquely identified by the IP address of the G-UPF 21 and the port number the G-UPF 21 has associated with the group, while the traffic between the user and his U-UPF 20 is identified by the IP address of the U-UPF 20 and the port number the U-UPF has associated with the group, so the MS can use the same socket to send and receive traffics from any groups (port number "200" is used in the following examples).

When a user becomes an active member of a group he gets from his U-CPF the port number assigned by his U-UPF to the group's traffic. And at the same time the U-CPF 22 sets the proper mappings between the user's U-UPF 20 and the group's G-UPF 21. More specifically, the U-UPF 20 gets the port number that the G-UPF 21 has assigned to the group's traffic.

A U-UPF 20 identifies incoming one-to-one traffic by the specific port number it has allocated for this kind of communications and the SSRC value assigned by the U-CPF 22 of the caller to the call during its establishment. In order to avoid the negotiation of dynamic port numbers between the MSs and the Uproxies 20, a static port number shall be allocated in all the MSs of the user and Uproxies ("102" in the following examples).

With the "splitted bridge" model described above it may happen that in the downlink a G-UPF 21 has to forward the incoming group traffic to separated Uproxies 20. For that kind of communications a specific port number is reserved and allocated in all the G-UPFs 21 and UProxies 20 ("100" in the following examples). When a G-UPF 21 or a U-UPF 20 receives traffic from this port "100", it is able to identify the special traffic and properly forward it according to the proper mapping settings performed by the G-CPF 23 or the U-CPF 22 that is handling the related session.

In order to better describe how group calls are managed on the user plane, an example will now be illustrated. The current group's speaker sends his audio packet to his U-UPF 20 that checks the packet and forwards it to the group's G-UPF 21. If the traffic passes the input filtering in the G-UPF 21, then it is individually delivered to the scanning processes of the active members directly handled by the local U-UPF (located in the G-UPF physical entities). At the same time the traffic is also forwarded-to the other UProxies involved, which will then serve their own active members.

Figure 11:
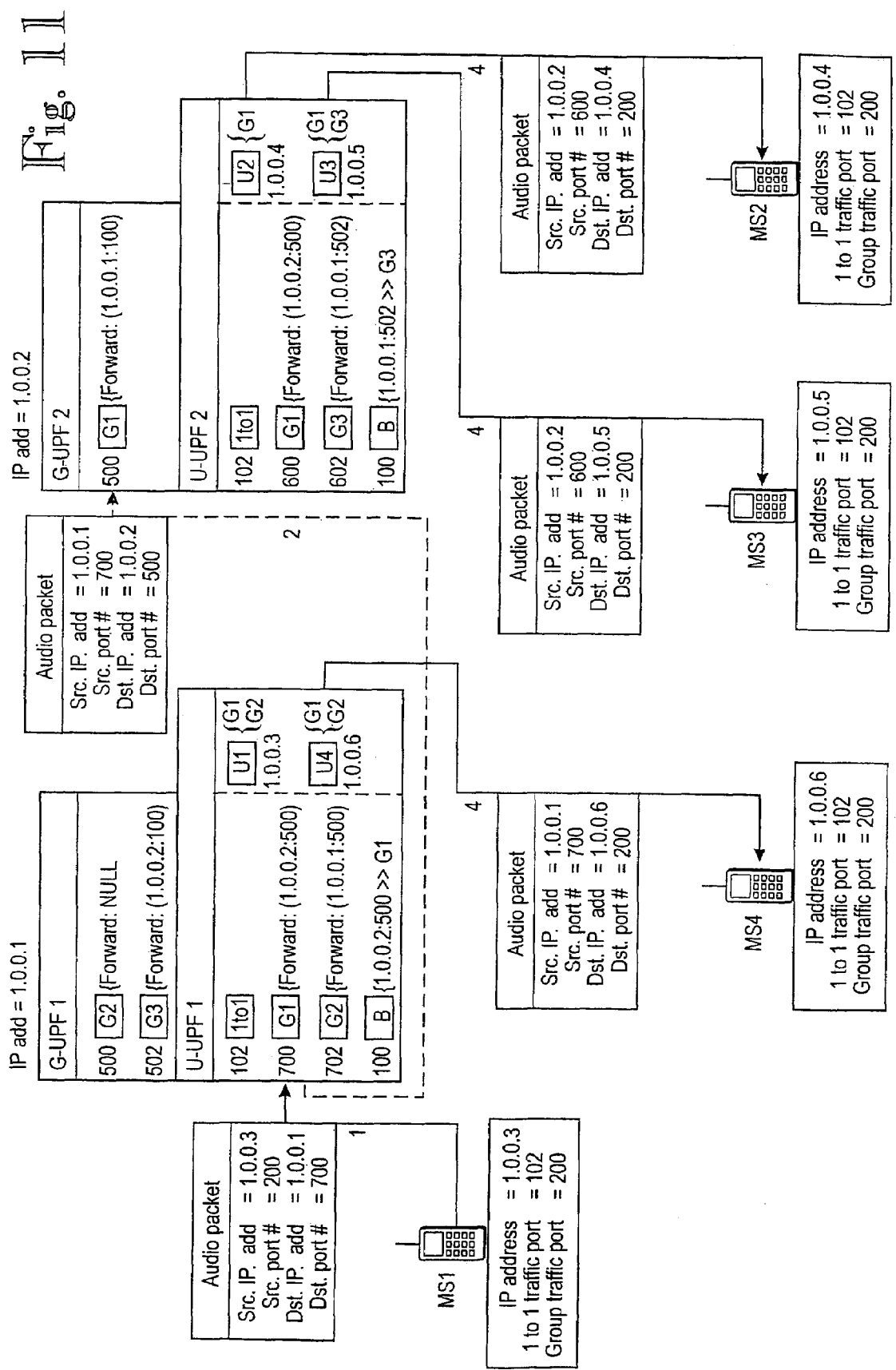
FIG. 11 is a block diagram illustrating user-plane group communication with two bridges involved.

An example of a group communication with two bridges involved is illustrated in FIG. 11. The G-UPF 1 and the associated U-UPF 1 have the IP address 1.0.0.1. The G-UPF 1 and the U-UPF 1 have ports 500 and 502, and 102, 700, 702 and 100. The G-UPF 2 and the U-UPF 2 have ports 500, and 102, 600, 602 and 100. In both bridges ports 100 and 102 are allocated for the purposes described above. The other ports are allocated to groups G1, G2 and G3, and to one-to-one communication, as can be seen in FIG. 11. The Forward operation in some of the ports means that a packet received to the respective port must be forwarded to an IP address and the port indicated. Mobile stations MS1-MS4 have the IP addresses as well as the one-to-one ports and the group traffic ports shown in FIG. 11. The U-UPF 1 has been as-signed to the Mobile stations MS1 and MS4. The U-UPF 2 has been assigned to the Mobile stations MS2 and MS3. The MS1 belongs to groups G1 and G2, the MS2 belongs to group G1, the MS3 belongs to groups G1 and G3, and the MS4 belongs to groups G1 and G2.

Let us now assume that the MS1 sends an audio packet 1 with a destination IP address 1.0.0.1 and a destination port 500. Consequently, the audio packet 1 is routed to the port 700 in the U-UPF 1. The port 700 has been allocated to the group G1, and therefore the U-UPF 1 multiplies the packet to all its users belonging to the group G1. In this case the audio packet 4 is sent to the MS4. The port 700 in the U-UPF 1 has also a Forward function to the IP address 1.0.0.2 and the port 500. Therefore, the U-UPF 1 sends a replica of the audio packet 1, i.e. the audio packet 2, to this destination. As a consequence, the audio packet 2 is routed to the port 500 in the G-UPF 2. The port 500 has been allocated to group G1, and therefore the U-UPF 2 multiplies A packet mode (e.g. IP) group communication service layer is provided on top of a standard mainstream cellular radio network. Conceptually, the group communication layer includes a pair of basic logical entities, an application bridge and a call processing server (CPS). The bridge and the CPS run group service applications which communicate with group service application(s) in a mobile station MS over the IP connections provided by the radio network. The CPS is responsible for control plane management of group communications. The bridge is responsible for the real-time distribution of VoIP packets to the user terminals according to their group memberships over valid connections programmed by the CPS. the packet to all its users belonging to the group G1. In this case the audio packets are sent to the mobile stations MS2 and MS3.

The port 700 in the G-UPF 2 has also a Forward function to the IP address 1.0.0.1 and the port 100. Therefore, the G-UPF 2 sends a replica of the audio packet 2 to this destination. As a consequence, the audio packet is routed to the port 100 in the U-UPF 1.

Multi-unicast

As described above, one aspect of the invention is that group communication in a mobile radio system is implemented using a group server, which receives voice packets addressed to a group and forwards these voice packets individually to each group member. The group server provides a number of groups (G1 . . . Gn). A group member sends voice packets to the group server; each packet is addressed to the group server but it also carries the identity of the group (G1 . . . Gn). The group server holds a table, for each group, containing the individual addresses of group members.

Figure 12:
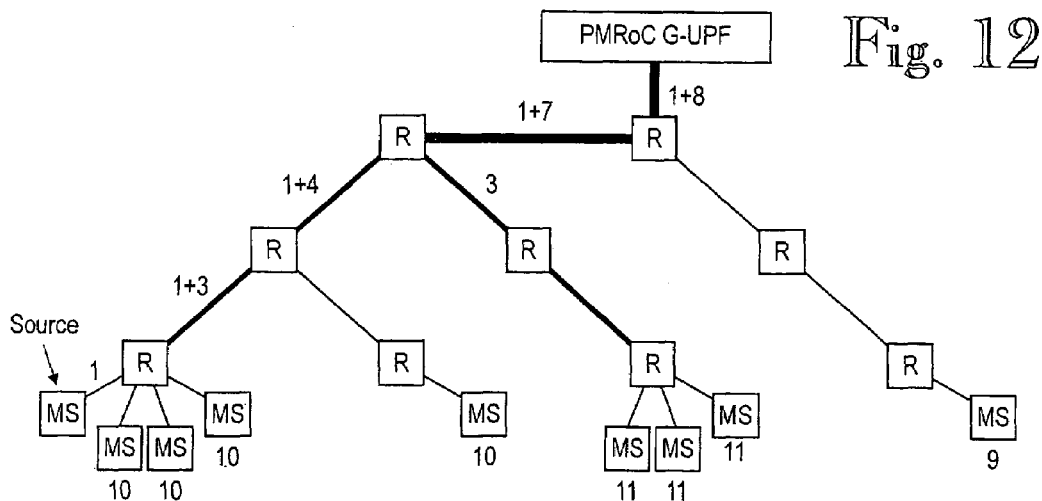
FIG. 12 is a diagram illustrating the multi-unicast concept.

In the example illustrated in FIG. 12, the source MS sends just one stream in the uplink, but then the G-UPF multiplies it for eight different recipients. On top of each link the number of streams transported in the uplink and in the downlink are respectively indicated, and each receiving MS is labeled with the number of hops needed by the packets to reach the respective MS. The reference symbol R represents any routing node in the system.

This concept is called multi-unicast herein. This concept is a nontraditional method for implementing group communication in a mobile radio network, and it greatly reduces the complexity of implementation of group communication services.

The core issue of group communication is how to deliver the communication to group members in an efficient manner in a mobile radio system. These systems may range in size from very small (from one base station) to nation-wide (thousands of base stations). Likewise the groups may be of different, even varying sizes. Even more difficult, the geographical distribution of a group can be anything from very local to nation-wide, and vary according to the circumstances. In other words, the problem in hand -is how to deliver the group traffic to each group member reliably regardless of the location of the member and the distribution of the members.

Traditional radio systems were small and groups usually local. Therefore the obvious solution was to use one transmission per base station for each group active in a specific area. The transmission was identified by a group address (multicast). The prior art approach involves many problems in a large communications system. Firstly, when a group call is made, the system needs to know which base stations to use for the call. Thus the system needs to implement a separate mobility management subsystem to keep track of the location of group members for each group. This causes a significant increase of the complexity of the system and can become the primary factor in the total processing load. Secondly, in order to receive group traffic, a mobile station has to hold the proper group addresses. Therefore, for everything to work properly, group membership must be known beforehand to both the mobile station and all the relevant system elements. This requires a distributed data management subsystem which has to operate over an unreliable and very low bandwidth radio channel.

These problems characterize the current state of the technology. The prior art systems circumvented the problem by not trying to optimize the use of base stations at all. Traffic of a group was radiated on a fixed, predefined set of base stations, thus relieving the need for mobility management for groups. This meant also that the system did not have to know the group members, and the group addresses were programmed into the mobile stations.

By means of the multi-unicast concept according to the invention, group communication in a large mobile system can be implemented reliably without adding large subsystems, which cause huge processing load and are prone to errors during operation—giving the users an experience of unreliable service. Because group traffic be delivered to recipients using the individual addressing and the basic mobility management of the system, group traffic becomes as reliable as individual traffic.

It can be argued that using individual delivery is more resource consuming than multicast delivery. This certainly was true in traditional PMR systems which were based on a large cell size; therefore a significant number of group members could be located within the range of a single base station. In modern cellular networks the use of large cells is inefficient from point of view of the frequency utilization, smaller and smaller cells are being deployed and therefore the probability of group members being located in the same cell is decreasing.

It should be noted that the basic architecture of the invention can also use some multicasting mechanism for audio data distribution, but that would require muticasting functionalities at the RAN with the above problems. Anyway, in this case it may be still reasonable to support both unicast (multi-unicast) and multicast distribution techniques in order to get benefit of unicasting where it is more efficient, for example when few members of a group have to be served at a site, or where multicasting is eventually not supported.

Scanning Filtering

In the current PMR system all traffic addressed to a user is delivered to his terminal which locally performs the filtering function to play out the single traffic that the user wants to listen to. This task has to be done according to the user's scanning settings and has to support the eventual overriding of the incoming traffic from higher priority groups or emergency calls.

In order to avoid the waste of bandwidth in the downlink for the transmission of traffic that will not be played out in the terminal, the filtering function obviously has to be implemented beforehand in the network, and this is one of the motivations for introducing the PMRoC Bridge 10 into the network architecture according to the preferred embodiment.

Figure 13:
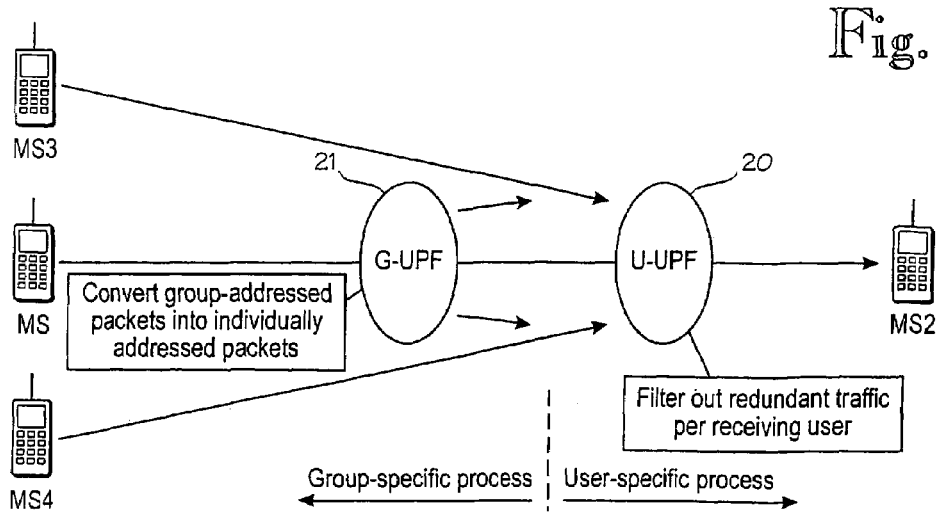
FIG. 13 is a block diagram illustrating the scanning filtering process.

The role of the bridge 10 in this context could be seen as two serial processes, namely group and user specific processes, as illustrated in FIG. 13. In the group specific process the G-UPF 21 has to multiply an incoming traffic in several packet streams which have to be forwarded to all the active members of the group to which the traffic is destined. In the user specific process, the U-UPF 20 has to decide which one of the several possible traffic streams addressed to a user actually needs to be forwarded to him. It is normally the traffic from the currently listened to group, but occasionally could be an overriding traffic stream.

In order to ensure conversation continuity (i.e. to ensure that a listener receives a coherent series of transmissions), a specific timer is provided in the U-UPF 20. The function of this timer is to keep the user receiving consecutive talkspurts in the same group (or individual call) unless there is a pause longer than a certain timeout in the conversation. Here we are talking about typical values between 2 and 15 seconds.

In principle this means that the scanning process shall lock to the received group after each packet, for the duration of this timer. U-UPFIt preferably has group specific timer values. It is also advisable to use a different timeout for group and individual traffic.

Figure 14:
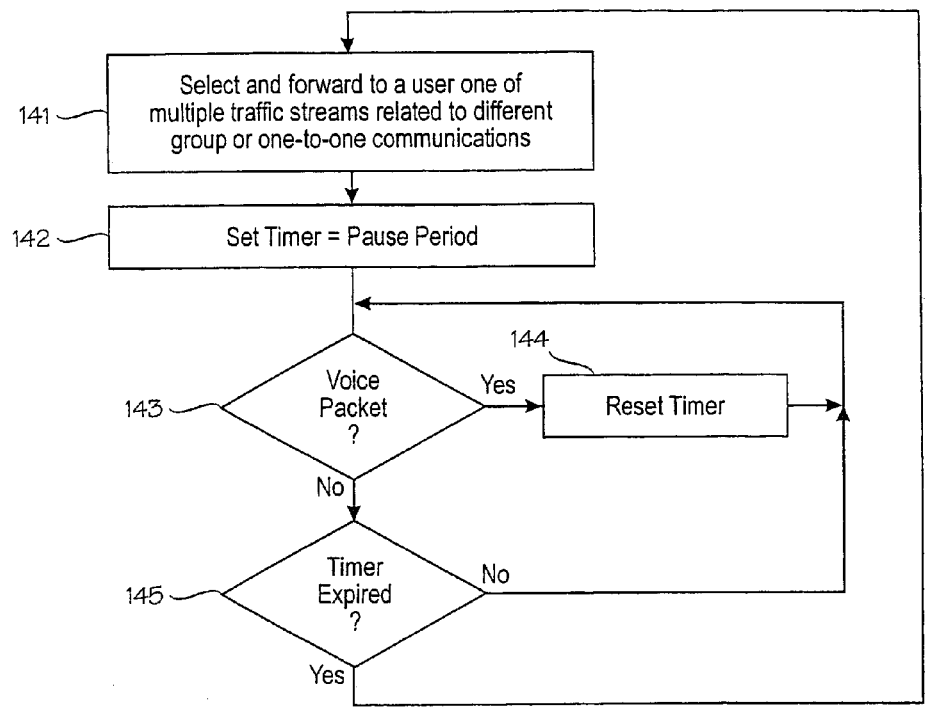
FIG. 14 illustrates an implementation of the scanning filtering process.

An example of the implementation of the scanning filtering process is illustrated in FIG. 14. In step 141, the process selects one of multiple (i.e. two or more) voice packet traffic streams arriving to the U-UPF 20 from the G-UPF(s) 21 (group communications) or from another user (one-to-one communication), and forwards the selected traffic stream to the user. Other arriving traffic streams are discarded, i.e. not forwarded to the user. When the selection is made, a timer is set to a predetermined value "Pause period", i.e. a maximum period of time between two consecutive voice packets in the selected traffic stream (step 142). In step 143, the process checks whether a new voice packet belonging to the selected traffic stream has been received. If a new voice packet has arrived, the timer is reset (step 144), and the process returns to step 143. If no new packet is received, it is checked whether the timer has expired (step 145). If the timer has not expired, the process returns to step 143. If the timer has expired, the process deems the selected traffic stream to be interrupted, and returns to step 141 to select a new traffic stream.

One-to-One Call Management

Figure 15:
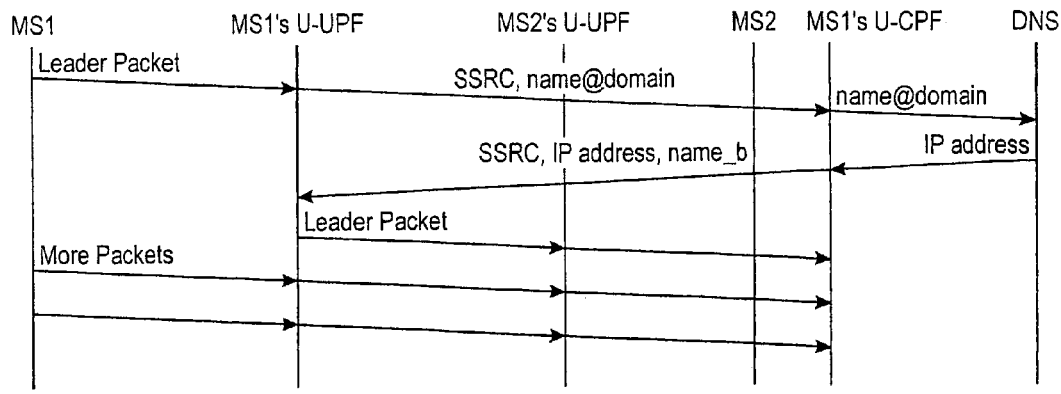
FIG. 15 is a signaling diagram illustrating signaling and communication relating to the setup of one-to-one communication.

An example of one-to-one call management is now described with reference to FIG. 15. A static port number is allocated into each U-UPF 20 for one-to-one traffic (such as the port 102 in FIG. 11).

If a user wants to establish a one-to-one communication, he pushes the PTT in his terminal MS1. The MS1 has just to send a leader packet containing his identity information (number or name) to his U-UPF using the specific "one-to-one" port number 102. By the SSRC value (assigned by the user's U-CPF 22) in the leader packet the called party's U-UPF will then be able to identify the caller's traffic and to forward it to the called party's U-UPF 20.

This special leader packet is identified as such by the use of a specific RTP payload type designated for this purpose. In addition to the identity of the called party (MS2), the leader packet may contain other relevant information.

Because the calling user's U-UPF 20 cannot convert the identity of the called party MS2 into an IP address, the MS1's U-UPF 20 forwards the identity (e.g. name@domain), using a suitable control protocol, to the caller's U-CPF 22 which then carries out a name query (either from an integrated name server or from a separate DNS). The MS1's U-CPF 22 also checks that the called party MS2 has logged on to the PMRoC service, and that the call rights settings permit the call between the two parties. Finally, the MS1's U-CPF 22 determines the correct form of the calling party identity to be shown to the called party (name_b). The returned IP address and name_b are then sent by the MS1's U-CPF to the MS1's U-UPF. The MS1's U-UPF now modifies the leader packet to contain name_b for forwarding to the called party MS2.

At this stage the calling party is talking and the terminal MS1 sending RTP packets containing voice to his U-UPF 20, which based on the SSRC field in the packet will find out the IP address of the called party's (MS2) U-UPF 20 to which it will forward the voice packets. Afterwards the called party's U-UPF will eventually deliver them (depending on the scanning process results) to the called party's terminal.

The called party ends the communication by releasing the PTT. The MS1 may now send a trailer packet in order to indicate the stop of the communication to the U-UPF. It is also possible to employ a continuity monitoring as described with respect to FIG. 9.

Let us now consider examples of some special signaling cases which may occur in one-to-one communication.

The called party may simultaneously receive traffic in a group. Because of the limited bandwidth of the downlink, it is not advisable to forward multiple voice streams to the same mobile station MS (unless it is known that there is enough bandwidth to support reception of multiple streams). Therefore, in one-to-one traffic in the downlink is routed through the same scanning process in the called user's U-UPF 20, as applies to the group traffic. This ensures that each MS is only being sent one voice stream at a time.

Similarly, the same called party may receive more than one one-to-one call to the same called party at the same time. Therefore, the called party's U-UPF shall detect if there is a one-to-one voice transfer ongoing to an MS, and prevent any simultaneous one-to-one streams to the same MS. This is preferably handled with the same process that prevents multiple talkers in a group (the incoming traffic in the one-to-one port is filtered according to the recognized SSRCs).

The person who initiates a one-to-one call expects that his voice is transported to the called party and that the called user will hear his voice. If, for any reason, this is not possible, the talking user shall be notified as soon as possible. Non-delivery can depend on many different reasons. Some of the reasons can be detected by the caller U-UPF which can then inform the talking party. An example of this is that the the voice packets cannot be delivered because the scanning process is forwarding higher priority traffic. Some cases can be detected by the caller U-CPF during the leader packet processing. Examples of this include that 1) the called party is unknown, 2) the called party is not currently logged on to the PMRoC service, and 3) call rights check indicates that one-to-one calls between the parties are not allowed. The remaining cases are more difficult. For instance, the called party may be unable to receive the packets because of being engaged in a circuit mode call. It is proposed that this is solved such that when an MS begins to receive one-to-one traffic, it will send backwards some packets to the caller U-UPF. A failure in this shall be detected by the bridge which will then notify the calling party. To ensure that the communicating parties experience a sense of mutual, two-way communication, the bridge shall implement timers to ensure that a) a speech item that has been allowed to start (packets are being forwarded) is not interrupted by any traffic (except when overridden by higher priority traffic), and b) a conversation is not interrupted between short breaks (of the order of some seconds) between the speech items.

It is assumed that these mechanisms are identical to those used in group communication, except that the correct timeout values may be different.

Security

It is a requirement that the users should be able to rely, up to a reasonable level, on the identifications (group, talking party e.g.) provided by the system. The users should be able to rely, up to a reasonable level, that the contents of the received data have not been tampered with. The reasonable level corresponds to what is provided by public, circuit switched telephone networks.

Two principal approaches have been identified to satisfy this requirement: 1) relying on the security provided by the RAN and the security provided by the IP network between the RAN and the CPS11 or the bridge10; and 2) using the IPSec authentication between the user equipment (the MS) and the CPS11 or the bridge10.

Relying on the security of both the underlying RAN and the IP network means specifically that 1) the CPS 11 and the bridge 10 check the identity of the transmitting user by looking at the source IP address; therefore the network prevents spoofing the source IP address; 2) an MS checks the identity of the transmitting CPS11 or the bridge10; therefore the network prevents spoofing the source IP address; 3) and the underlying network does not easily allow tampering with the contents of the packets.

The majority of users do not require extreme security. Usually a satisfactory level is achieved by air interface encryption in the RAN and preventing outside access to the traffic in the IP network. If necessary, the security of the IP network can be improved by using the IPSec between the network elements (this applies both to the IP network and to the PMRoC elements: the CPS 11 and the bridge 10).

As an option, the architecture according to the invention allows using the IPSEC authentication headers (AH) between the MS and its U-UPF 20. Each MS (or the user, if needed) has a public-private key pair; likewise the U-UPF 20 has a public-private key pair. Standard IPSec mechanisms can then be used to set up a security association between the MS and its U-UPF 20.

This arrangement allows the authentication of an MS (or a user) which is logging on to the PMRoC service. After the log-on, the IPSEC authentication headers must be used in all packets from the MS to the U-UPF 20. In this way the origin and integrity of the packets arriving at the proxy 20 (or CPS in case of control) can be verified. Similarly, authentication headers can be used in all packets from the proxy to the MS, which allows the MS to verify the origin and the integrity of the packets. In this manner, the security becomes a matter of trust between the MS and the proxy.

In other words, each MS subscribing to the PMRoC service has a two-way Security Association (SA) with its U-UPF20. A complete working setup will require in addition: 1) A means to set up and manage the security associations (IKE); 2) A means to verify the public keys with a trusted source, and 3) A means to generate and distribute the public and private keys (ISAKMP).

Even if this mechanism may look complicated, it uses standard and readily available solutions. If the IPSec authentication is taken into use later, it can be taken into use gradually by installing it in one U-UPF 20, which will be used to serve users with IPSec only. In other words, it is possible to support both authenticating and non-authenticating MSs and proxies.

Encryption

It is a requirement that specific users be able to use end-to-end encryption. As a simpler alternative, two-leg end-to-bridge-to-end encryption should be considered, because this greatly simplifies key management.

For users with higher encryption requirements than what is provided by air interface encryption of the underlying network, IPSEC ESP can be used to provide confidentiality (encryption) between the MS and the bridge. This, of course, requires that the IPSec is in use.

For instance, MS1 will encrypt the payload of the voice packets for sending to the proxy. The proxy will decrypt the packets, and then encrypt them again for forwarding to MS2. This provides almost the same level of security to the users as does end-to-end encryption, without any need for the communicating parties to share keys. Therefore, the usual key management problems associated with end-to-end encryption do not exist in this model.

In the proposed model, the PMRoC elements (CPS, Bridge) are the only security critical components in the network. Therefore, for users with very high security requirements, it might be feasible to install separate user proxies and bridges on secure premises under the control of the user group.

The description only illustrates preferred embodiments of the invention. The invention is not, however, limited to these examples, but it may vary within the scope and spirit of the appended claims.

The invention claimed is:

1. A method, comprising
providing a group server layered on top of a communications system for packet mode group communication,
providing said group server with individual addresses of group members in at least one group communication group,
receiving real-time transfer protocol voice packets from one of said group members to said group server, each real-time transfer protocol voice packet being addressed to said at least one group with a port number,
forwarding said real-time transfer protocol voice packets individually to each receiving one of said group members on the basis of said individual addresses.

2. A method according to claim 1, wherein said forwarding comprises forwarding said real-time transfer protocol voice packets individually via user servers provided on top of the said mobile communications system, said user sewers managing user specific real-time transfer protocol voice packet streams to and from users.

3. A method, comprising
providing a group server layered on top of a communications system for packet mode group voice communication,
providing said group sewer with individual addresses of group members of a group communication group,
creating an individual logical connection from each group member to said group server by means of outband signaling,
starting a speech item in said group in response to receiving a leader packet from one of said group members to said group server over said individual logical connection, each leader packet containing the identifier of the respective group member,
said group server either i) rejecting said staffed speech item, or ii) granting the stated speech item to said one group member and forwarding said leader packet and subsequent voice packets individually to each receiving one of said group members in said group on the basis of said individual addresses, and wherein said leader packet and said subsequent voice packets received from one of said group members to said group server are real-time transfer protocol voice packets, each real-time transfer protocol voice packet being addressed to said at least one group with a port number.

4. A method according to claim 3, further comprising
allocating an uplinik bearer for said one group member in an air interface of said communications system prior to said one group member sends said leader packet and prior to said granting of said speech item, and
allocating a downlinik bearer in an air interface for each receiving group member in response to receiving a leader packet forwarded by said group server and addressed to said respective group member.

5. A method, comprising
providing a group server layered on top of a communications system and configured to serve a group communication group for a packet mode group voice communication,
granting a speech item to one group member of said group communication group,
setting a first timer to measure a predetermined idle period in response to said granting,
resetting said first timer each time a voice packet is received from said one of said group members to said group server,
ending said granted speech item if said first timer expires indicating that said predetermined idle period has elapsed from said granting or from last reception of a voice packet from said one group member, and wherein said voice packets are real-time transfer protocol voice packets, each real-time transfer protocol voice packet being addressed to said at least one group with a port number.

6. A method according to claim 5, further comprising
ending said granted speech item if a maximum allowed period of time has elapsed from the granting.

7. A method according to claim 5, further comprising
said one group member sends a trailer packet having a predetermined payload in order to indicate the end of sending,
the group server ends said speech item in response to receiving said trailer packet.

8. A method, comprising
providing a server layered on top of the communications system and configured to manage traffic streams addressed to a user who is active in at least one group communication group for a packet mode group voice communication or in a packet mode one-to-one voice communication,
receiving at said user specific server a first voice packet stream related to a first group or one-to-one communication and forwarding said first voice packet stream to said respective user, said first voice packet stream received at said user specific server comprising real-time transfer protocol voice packets, each real-time transfer protocol voice packet being addressed to said first group or one-to-one communication with a port number,
monitoring at said user specific server continuity of said first voice packet stream,
receiving at said user specific server at least one further voice packet stream related to at least one farther group or one-to-one communication, said further voice packet stream received at said user specific sewer comprising real-time transfer protocol voice packets, each real-time transfer protocol voice packet being addressed to said at least one further group or one-to-one communication with a port number,
forwarding no one of said at least one further voice packet streams to said user if said first voice packet data stream is continuous,
forwarding one of said at least one farther voice packet streams to said user if said first voice traffic stream has been discontinued for a predetermined period of time.

9. A method according to claim 8, wherein said monitoring further comprises
setting a timer to measure said predetermined period of time when a first packet of said first voice packet stream is forwarded to said user,
resetting said timer each time a new packet of said first voice packet stream is forwarded to said user,
determining said first voice packet stream to be discontinued if said timer expires.

10. A method according to claim 8 or 9, said method further comprising
interrupting said first voice packet stream immediately when a voice packet stream having higher priority is received at said server.

11. A server system, comprising a group server provided on a layer on top of a communications system for providing a packet mode group communication service, said group server further comprising:
a data memory storing individual addresses of group members in at least one group communication group,
said group server being configured to receive voice packets from said group members, each received voice packet containing information identifying the communication group which the respective packet is addressed to, wherein said voice packets received from one of said group members to said group server are real-time transfer protocol voice packets, each real-time transfer protocol voice packet being addressed to said at least one group with a port number,
said group server being configured to forward each voice packet received from said group member having a speech item in a group communication group separately to each receiving member in said respective group communication group on the basis of said individual addresses.

12. A server system according to claim 11, wherein said information identifying the communication group identify a port assigned to said group in said group server.

13. A server system according to claim 11, further comprising
a call processing server provided on top of said mobile communications system, said call processing server being responsible for control plane management of the group communications in said group server.

14. A server system according to claim 11, wherein said group server configured to grant a speech item further comprises
a first timer responsive to said granting the start of the measurement of a predetermined idle period from said granting,
said group server being configured to reset said first timer each time a voice packet is received from said one group member having said granted speech item,
said group server being configured to end said granted speech item if said first timer expires indicating that said predetermined idle period has elapsed from said granting or from the last reception of a voice packet from said one group member.

15. A server system according to claim 13, wherein said call processing server is configured to establish an individual logical connection from each group member to said group server by means of outband signaling carried out between said call processing server and each group member, and wherein said group server configured to grant a speech item further comprises
said group server being configured to receive a leader packet starting a speech item in said group from one of said group members to said group server over respective said individual logical connection, said leader packet containing identifier of the respective group member,
said group server being configured to either i) reject said started speech item, or ii) grant said staffed speech item to said one group member and forward said leader packet and subsequent voice packets individually to each receiving one of said other members in said group on the basis of said individual addresses.

16. A server system according to claim 11, wherein said voice packets are VoIP packets.

17. A server system according to claim 11, said server system further comprising group management server providing a user interface for a remote creation and management of group communications group in said server system.

18. A server system according to claim 17, wherein said user interface is based on one of the World Wide Web (WWW) and Wireless Application Protocol (WAP) technologies.

19. A server system according to claim 11, wherein said group server is interconnected to said mobile communications network by an Internet Protocol (IP) based network.

20. A server system according to claim 11, wherein said group server is configured to grant a speech item to one group member per a communication group in turn.

21. A server systems, comprising a group server provided on a layer on top of a communications system for providing a packet mode group communication service, wherein
said group server is configured to a mechanism which identifies identify and authenticate a source of group communication,
said group server is configured to control that only one group member in a group talks at a time,
said group server is configured to receive voice packets from at least one of said group members to said group server, said voice packets received from one of said group members to said group server being real-time transfer protocol voice packets, each real-time transfer protocol voice packet being addressed to said at least one group with a port number,
said group server is configured to check active group members in a group to which voice packets from a previously talking group member are destined to and generate from an incoming voice packet an outgoing packet to be forwarded separately to each of said active group members, and
said group server is configured select one traffic stream among possible multiple incoming traffic streams destined to one group member and to forward the selected traffic stream to said one group member.

22. A server system, comprising:
at least one first server provided on a layer on top of the communications system and configured to provide group specific communications functions for a packet mode group communication,
said first server further comprising a data memory storing individual addresses of group members in at least one group communication group,
said first server being configured to receive voice packets from said group members, said voice packets received from said group members to said group server being real-time transfer protocol voice packets, each real-time transfer protocol voice packet being addressed to said at least one group with a port number,
said first server being configured to grant a speech item to one group member per communication group in turn, said first server being configured to unicast each voice packet received from said group member having a speech item in a group communication group separately to each receiving member in said respective group communication on the basis of said individual addresses, a second server providing user-specific communications functions, any group related communication from a user managed by said second server being routed first to said second server and then forwarded to an appropriate first server, and any unicast voice packet from said at least one first server being routed first to said second server prior to sending the voice packet to the respective user.

23. A server system according to claim 22, wherein said information identifying the communication group identify a port assigned to said group in said group server.

24. A server system according to claim 23, said server system further comprising group management server providing a user interface for a remote creation and management of group communications group in said server system.

25. A server system according to claim 24, wherein said user interface is based on one of the World Wide Web (WWW) and Wireless Application Protocol (WAP) technologies.

26. A server systems, comprising:
at least one group server provided on a layer on top of the communications system and configured to provide group specific communications functions for a packet mode group voice communication, said group server further comprising
said group server being configured to control that only one group member in a group talks at a time,
said group server is configured to receive voice packets from of said group members to said group server, said voice packets received from said group members to said group server being real-time transfer protocol voice packets, each real-time transfer protocol voice packet being addressed to said at least one group with a port number,
said group server being configured to check active group members in a group to which voice packets from a currently talking group member is destined to and generates from an incoming voice packet an outgoing packet to be forwarded separately to each of said active group members,
a user server providing user-specific communications functions on a user plane, said user server further comprising
said user server being configured to identify and authenticate a source of group communication,
said user server being configured to select one traffic stream among possible multiple incoming traffic streams destined to one group member and to forward the selected traffic stream to said one group member.

27. A server system according to claim 26, said system further comprising
a group call processing server provided on top of the said communications system, said group call processing server being responsible for control plane management of the group communications in said group server, and
a user call processing server provided on top of said communications system, said user call processing server being responsible for control plane management of the communications in said user server.

28. A server system according to claim 26, wherein said group server configured to manage that only one group member in a group talks at a time further comprises
a first timer responsive to a grant of a speech item for starting to measure a predetermined idle period from said granting,
said group server being configured to reset said first timer each time a voice packet is received from said one group member having said granted speech item,
said group server being configured to end said granted speech item, if said first timer expires indicating that said predetermined idle period has elapsed from said granting or from last reception of a voice packet from said one group member.

29. A server system according to claim 26, wherein said user call processing server is configured to establish an individual logical connection between each group member and said user server by means of outband signaling carried out between said user call processing server and each group member, and wherein said group server configured to manage that only one group member in a group talks at a time further comprises
said group server being configured to receive a request for a speech item in said group from one of said group members to said group server over respective said individual logical connection, said request being in form of a leader packet containing identifier of the respective group member,
said group server being configured to either i) reject said request for a speech item, or ii) grant the speech item to said one group member and forward said leader packet and subsequent voice packets individually to each receiving one of said other members in said group.

30. A server system according to claim 26, wherein said voice packets are VoIP packets.

31. A server system according to claim 26, wherein said group server is interconnected to said mobile communications network by an Internet Protocol (IP) based network.

32. A server system, comprising:
at least one group server provided on a layer on top of the communications system for a packet mode group communication service and configured to provide group specific communications functions in a user plane, a data memory storing individual addresses of group members in at least one group communication group in said group server,
said group server being configured to receive voice packets from said group members, said voice packets received from said group members to said group server being real-time transfer protocol voice packets, each real-time transfer protocol voice packet being addressed to one of said communication groups with a port number
said group server being configured to grant a speech item to one group member per communication group in turn,
said group server being configured to unicast each voice packet received from said group member having a speech item in a group communication group separately to each receiving member in said respective group communication on the basis of said individual addresses,
a user server providing user-specific communications functions on a user plane, any group related communication from a user managed by said user server being routed first to said user server and then forwarded to an appropnate group server, and any unicast voice packet from said at least one group server being routed first to said user server prior to sending the voice packet to the respective user,
a group call processing server responsible for control plane management of the group communications in said group server, and
a user call processing server responsible for control plane management of the communications in said user server.

33. A devices, comprising
said device being configured to grant a speech item to one group member in group communication group at time in a packet mode group voice communication,
a first timer responsive to said granting for starting to measure a predetermined idle period from said granting,
said device being configured to receive voice packets from said group members, said voice packets received from said group members to said group server being real-time transfer protocol voice packets, each real-time transfer protocol voice packet being addressed to said communication group with a port number,
said device being configured to reset said first timer each time a voice packet is received from said one of said group members,
said device being configured to end said granted speech item, if said first timer expires indicating that said predetermined idle period has elapsed from said granting or from last reception of a voice packet from said one group member.

34. A device, comprising:
said device being configured to manage traffic streams addressed to a user who is active in at least one group communication group or in one-to-one communication in a mobile communications system having a packet mode group voice communication feature,
said device being configured to receive at least two voice packet streams addressed to a user who is active in at least two packet mode group or one-to-one voice communications, each of said at least two said voice packet streams received to said device comprising real-time transfer protocol voice packets, each real-time transfer protocol voice packet being addressed to one of said at least two group or one-to-one communications with a port number,
said device being configured to monitor continuity of said forwarded voice packet streams,
said device being configured to forward no other one of said received voice packet streams related to at least one further group or one-to-one communication, if said first voice packet stream is continuous, and to select and forward other one of said voice packet streams to said user if said previous selected and forwarded voice traffic stream has been discontinued for a predetermined period of time.

35. A device according to claim 34, further comprising
a timer which is set to measure said predetermined period of time when a first packet of said selected voice packet stream is forwarded to said user,
said device being configured to reset said timer each time a new packet of said selected voice packet stream is forwarded to said user,
said device being configured to determine said selected voice packet stream to be discontinued if said timer expires.

36. A device according to claim 34, said device being configured to interrupt said first voice packet stream immediately when a voice packet stream having higher priority is received.

37. A method, comprising
providing a communication server layered on top of a mobile communications system,
creating an individual logical connection between said communication server and each user having an active communication service in said communication server,
starting a communication in response to receiving a leader packet from a sending user to said communication server over respective said individual logical connection, each leader packet containing an identifier of said sending user and a receiving user,
said communication server either i) rejects said staffed speech item, or ii) grants the staffed speech item to said sending user and forwards said leader packet and subsequent voice packets to said receiving user on the basis of said received identifier of said receiving user, and wherein said leader packet and said subsequent voice packets received from said sending to said communication server are real-time transfer protocol voice packets, each real-time transfer protocol voice packet being addressed to a specific one-to-one voice communication with a port number.

38. A method according to claim 37, wherein said forwarding further comprises
inquiring an IP address of said receiving user from a communication control server on the basis of said received identity of said receiving user,
forwarding said leader packet and subsequent voice packets to said IP address of said receiving user.

39. A method according to claim 37, wherein said sending user sends the leader packet and the subsequent packets to a specific port assigned for one-to-one communication in said communication sewer.

40. A subscriber equipment, comprising
said subscriber equipment being configured for packet data communication over a mobile communications system having a packet mode group voice communication service,
a group communication application layered on top of said packet data communication,
said application being configured to establish a logical packet connection to a group communication server,
said application being configured to send and receive voice packets to and from said group communications server,
and wherein said voice packets sent from said subscriber equipment to said group communication sewer are real-time transfer protocol voice packets, each real-time transfer protocol voice packet being addressed to a group communication group with a port number.

41. A subscriber equipment according to claim 40, said equipment further comprising
a push-to-talk switch,
said subscriber equipment being configured, reactive to activation of said push-to-talk switch by a user, to send a leader packet followed by voice packets to said group communication server over said logical connection and thereby staffs a speech item,
said subscriber equipment being configured, reactive to receiving an indication that a speech item is not granted to the user is received from said group communication server after sending said leader packet, to stop sending further packets and stop the speech item although the push-to-talk switch is still activated, said subscriber equipment being configured mechanism, reactive to deactivation of said push-to-talk switch by the user, to stop the speech item and stop sending further voice packets.

42. A subscriber equipment according to claim 41, wherein said-subscriber equipment being configured, reactive to deactivation of said push-to-talk switch by the user, to send a trailer packet to said group communication server over said logical connection and thereby stop the speech item.

43. A subscriber equipment according to claim 41, wherein said indication is a reception of a voice or leader packet originating from another user in a group communication group after sending said leader packet.

44. A subscriber equipment according to claim 41, wherein said indication is the reception of a voice packet having predetermined payload type after sending said leader packet.

45. A subscriber equipment according to claim 41, wherein said subscriber equipment is configured in response to the reception of said indication, alert the user of the fact the speech item was not granted.

46. A subscriber equipment according to claim 41, wherein said subscriber equipment is configured, reactive to deactivation of said push-to-talk switch by the user, sends a trailer packet to said group communication server over said logical connection and thereby stops the speech item.

47. A subscriber equipment according to claim 41, wherein said subscriber equipment is configured to give an audible indication to the user start speaking after the activation of said push-to-talk switch.

48. A subscriber equipment according to claim 47, comprising a timer enabling said audible indication after a predetermined period of time has expired from said activation of said push-to-talk switch.

49. A subscriber equipment according to claim 47, wherein said subscriber equipment is configured to give said audible indication after one of the connection setup phases has been reached; 1) after an uplink bearer has been allocated, 2) after said leader packet has been sent, 3) after said group communication server has processed said leader packet and granted a speech item, 4) after a receiving party has acknowledged said leader packet.

50. A server system, comprising a group server provided on a layer on top of a communications system for providing a packet mode group voice communication service for said communications system, a data memory storing individual addresses of group members in at least one group communication group, said group server being configured to receive real-time transfer protocol voice packets from one of said group members to said group server, each real-time transfer protocol voice packet being addressed to at least one group with a port number, said group server being configured to forward said real-time transfer protocol voice packet individually to each receiving one of said group members on the basis of said individual addresses.

51. A method, comprising configuring subscriber equipment for packet data communication over a mobile communications system having a packet mode group voice communication service, providing said subscriber equipment with a group communication application layered on top of said packet data communication, establishing by said group communication application a logical packet connection to a group communication server, sending and receiving by said group communication application real-time transfer protocol voice packets to and from said group communications server, each real-time transfer protocol voice packet being addressed to a group communication group with a port number.

* * * * *